US012745288B2

(12) United States Patent
Ouchi

(10) Patent No.: US 12,745,288 B2
(45) Date of Patent: Sep. 22, 2026

(54) COMMUNICATION APPARATUS, AND CONTROL METHOD

(71) Applicant: CANON KABUSHIKI KAISHA, Tokyo (JP)

(72) Inventor: Masatomo Ouchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 281 days.

(21) Appl. No.: 18/616,354

(22) Filed: Mar. 26, 2024

(65) Prior Publication Data

US 2024/0237083 A1 Jul. 11, 2024

Related U.S. Application Data

(63) Continuation of application No. PCT/JP2022/036385, filed on Sep. 29, 2022.

(30) Foreign Application Priority Data

Oct. 6, 2021 (JP) ................................ 2021-164933

(51) Int. Cl.
*H04W 74/0833* (2024.01)
*H04W 72/0453* (2023.01)
(Continued)

(52) U.S. Cl.
CPC ... *H04W 74/0833* (2013.01); *H04W 72/0453* (2013.01); *H04W 74/0866* (2013.01); *H04W 84/12* (2013.01)

(58) Field of Classification Search
CPC ......... H04W 74/0833; H04W 72/0453; H04W 74/0866
See application file for complete search history.

(56) References Cited

U.S. PATENT DOCUMENTS

| | | | | |
|---|---|---|---|---|
| 10,531,433 | B2 * | 1/2020 | Frederiks | H04B 7/0452 |
| 10,772,138 | B2 * | 9/2020 | Lanante | H04W 74/08 |
| 11,228,406 | B2 | 1/2022 | Ouchi | |

FOREIGN PATENT DOCUMENTS

| | | | |
|---|---|---|---|
| JP | 2017537522 | A | 12/2017 |
| WO | 2016069399 | A1 | 5/2016 |
| WO | 2018047570 | A1 | 3/2018 |

OTHER PUBLICATIONS

Japanese Office Action dated Jun. 16, 2025 in counterpart Japanese Patent Appln. No. 2021-164933.

(Continued)

*Primary Examiner* — Justin Y Lee
(74) *Attorney, Agent, or Firm* — Venable LLP

(57) ABSTRACT

A communication apparatus performs setting of connection between the communication apparatus and another communication apparatus, receives from the other communication apparatus a predetermined radio frame including information designating frequency resources for transmitting data from the other communication apparatus to at least one apparatus, and, in a case where a first identifier for random access is assigned to the communication apparatus in the setting of the connection, performs communication by acquiring a transmission right of data to the other communication apparatus by random access based on a sum of a first number of frequency resources associated with the first identifier and a second number of frequency resources associated with a second identifier for random access different from the first identifier in the predetermined radio frame.

20 Claims, 15 Drawing Sheets

(51) Int. Cl.
*H04W 74/08* (2024.01)
*H04W 84/12* (2009.01)

(56) References Cited

OTHER PUBLICATIONS

International Search Report and Written Opinion issued on Nov. 15, 2022 in parent Application PCT/JP2022/036385.
Kedem, UORA Enhancements to address RTA, IEEE 802.11-20/1902r0, IEEE mentor, Nov. 29, 2020, 17 pages.

* cited by examiner

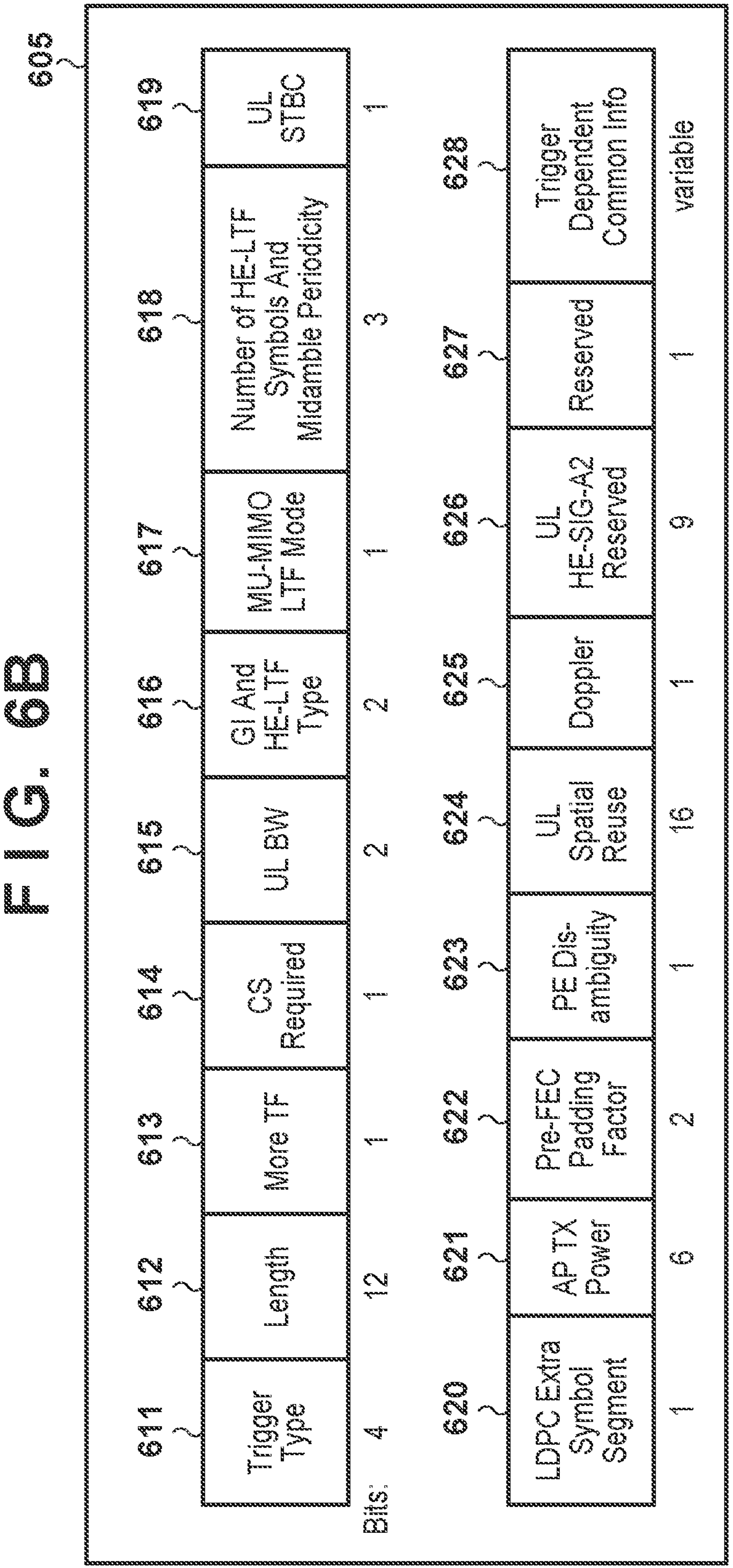
F I G. 6B
605
611
Trigger Type
612
Length
613
More TF
614
CS Required
615
UL BW
616
GI And HE-LTF Type
617
MU-MIMO LTF Mode
618
Number of HE-LTF Symbols And Midamble Periodicity
619
UL STBC
Bits: 4 12 1 1 2 2 1 3 1
620
LDPC Extra Symbol Segment
621
AP TX Power
622
Pre-FEC Padding Factor
623
PE Dis-ambiguity
624
UL Spatial Reuse
625
Doppler
626
UL HE-SIG-A2 Reserved
627
Reserved
628
Trigger Dependent Common Info
1 6 2 1 16 1 9 1 variable F I G. 6C
611
| Trigger Type subfield value | Description |
|---|---|
| 0 | Basic Trigger |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |
F I G. 6D
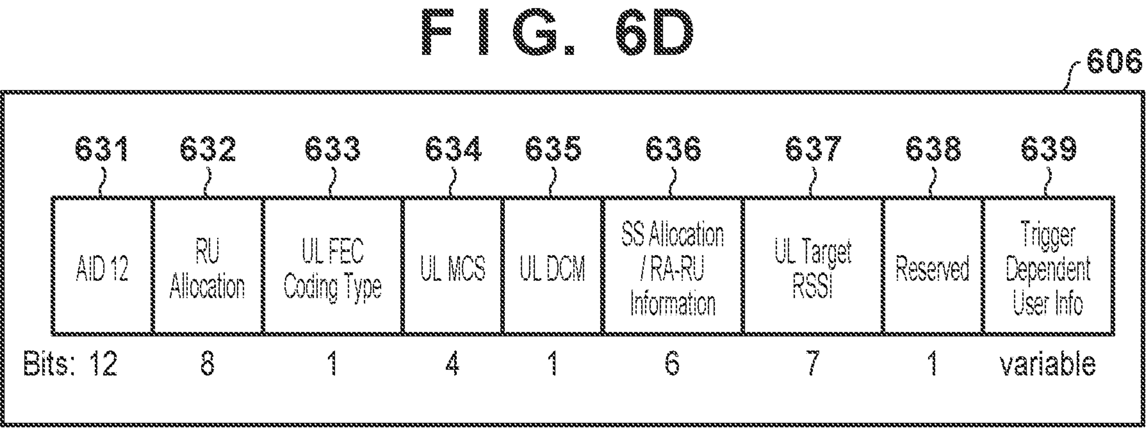

S701
S702
S704
S707
S709
S713
INITIAL SETTING UORA
INITIALIZE G-AID TABLE
UPDATE G-AID TABLE
Beacon (CHANGE UORA)
TRANSMIT TF
Multi-STA BA
100
AP
S703
G-AID CONNECTION
101
STA
TRANSMIT UL TB PPDU
S711
S705
CONNECT
102
STA
S706
G-AID CONNECTION
103
STA
S708
S710
TRANSMIT UL TB PPDU
S712
104
STA
UPDATE OBO COUNTER
REDUCE OBO ACCOMPANYING TF RECEPTION

F I G. 7B 721 722 723 724

| | STA101 (G-AID = 2040) | STA102 | STA103 (G-AID = 2040) | STA104 (UNCONNECTED) |
|---|---|---|---|---|
| | OBO VALUE | | | |
| | OBO = 3 | OBO = 3 | OBO = 3 | OBO = 2 |
| RU1 (AID = 0) | **OBO = 0 OBTAIN ACCESS RIGHT** | **OBO = 2** | **OBO = 0 OBTAIN ACCESS RIGHT** | |
| RU2 (AID = 2040) | | | | |
| RU3 (AID = 2040) | | | | |
| RU4 (AID = 2045) | | | | **OBO = 1** |

FIG. 8A

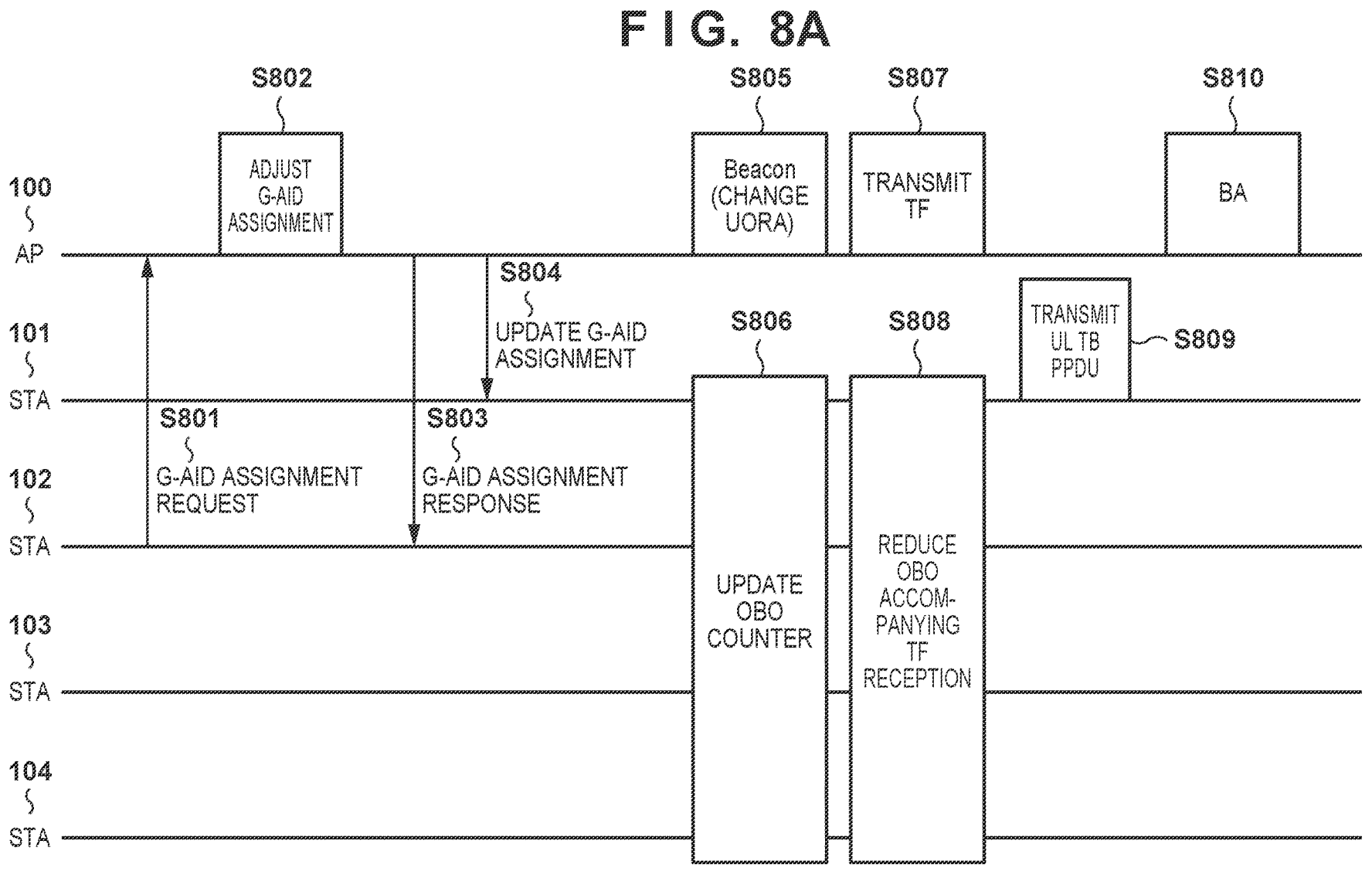

100 AP
101 STA
102 STA
103 STA
104 STA

S801 G-AID ASSIGNMENT REQUEST
S802 ADJUST G-AID ASSIGNMENT
S803 G-AID ASSIGNMENT RESPONSE
S804 UPDATE G-AID ASSIGNMENT
S805 Beacon (CHANGE UORA)
S806 UPDATE OBO COUNTER
S807 TRANSMIT TF
S808 REDUCE OBO ACCOMPANYING TF RECEPTION
S809 TRANSMIT UL TB PPDU
S810 BA

FIG. 8B

| 721 | STA101 (G-AID = 2040, 2041) | STA102 (G-AID = 2040) | STA103 (G-AID = 2040) | STA104 (UNCONNECTED) |
|---|---|---|---|---|
| 724 | OBO VALUE | | | |
| 723 722 | OBO = 3 | OBO = 3 | OBO = 3 | OBO = 2 |
| RU1 (AID = 0) | OBO = 0 OBTAIN ACCESS RIGHT | OBO = 1 | OBO = 1 | |
| RU2 (AID = 2040) | | | | |
| RU3 (AID = 2041) | | | | |
| RU4 (AID = 2045) | | | | OBO = 1 |

FIG. 8C

| 721 | STA101 (G-AID = 2041) | STA102 (G-AID = 2040) | STA103 (G-AID = 2040) | STA104 (UNCONNECTED) |
|---|---|---|---|---|
| 724 | OBO VALUE | | | |
| 723 722 | OBO = 3 | OBO = 3 | OBO = 3 | OBO = 2 |
| RU1 (AID = 0) | OBO = 0 OBTAIN ACCESS RIGHT | OBO = 1 | OBO = 1 | |
| RU2 (AID = 2040) | | | | |
| RU3 (AID = 2041) | | | | |
| RU4 (AID = 2045) | | | | OBO = 1 |

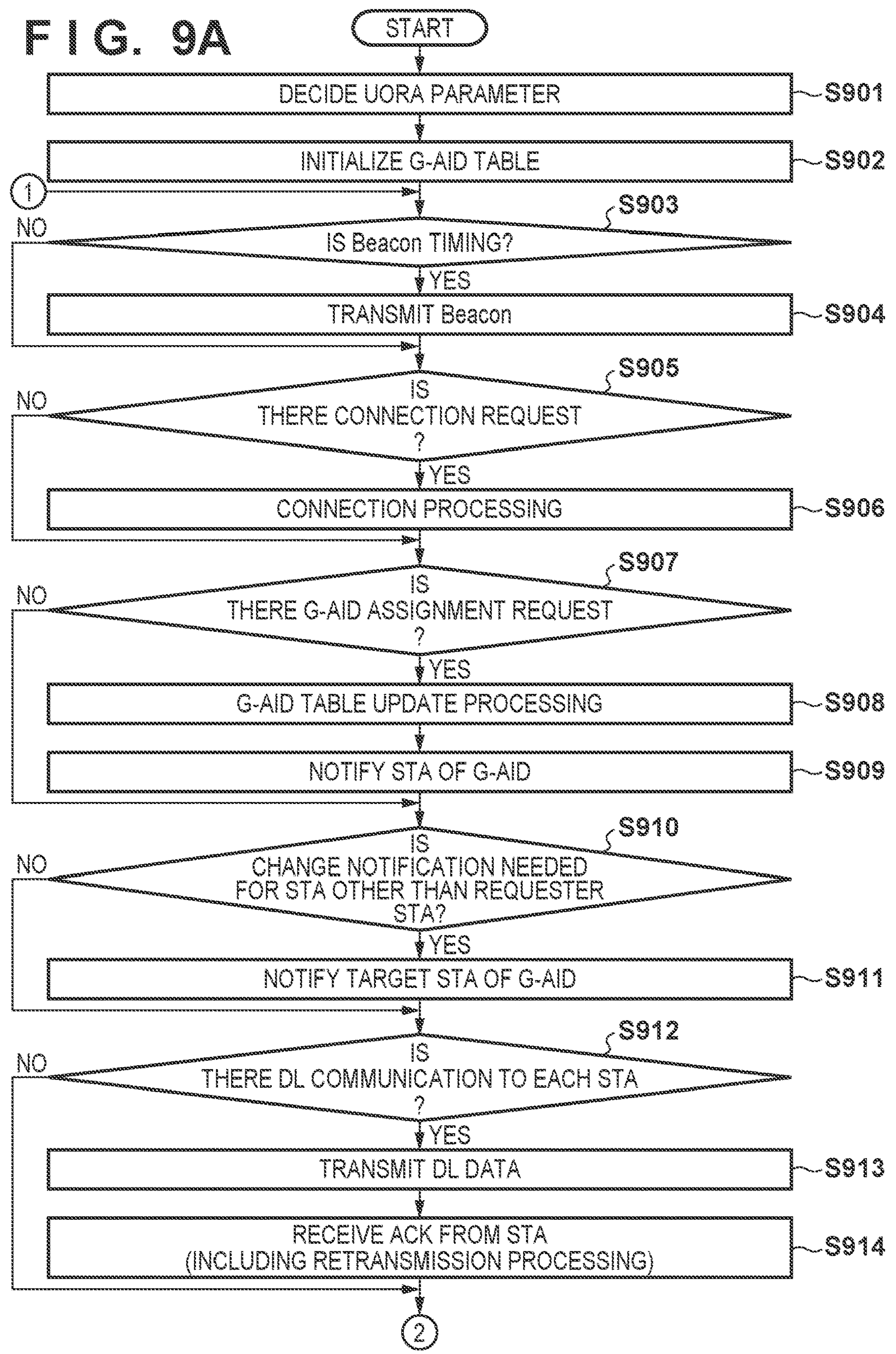
F I G. 9A
START
DECIDE UORA PARAMETER
S901
INITIALIZE G-AID TABLE
S902
1
IS Beacon TIMING?
S903
NO
YES
TRANSMIT Beacon
S904
IS THERE CONNECTION REQUEST ?
S905
NO
YES
CONNECTION PROCESSING
S906
IS THERE G-AID ASSIGNMENT REQUEST ?
S907
NO
YES
G-AID TABLE UPDATE PROCESSING
S908
NOTIFY STA OF G-AID
S909
IS CHANGE NOTIFICATION NEEDED FOR STA OTHER THAN REQUESTER STA?
S910
NO
YES
NOTIFY TARGET STA OF G-AID
S911
IS THERE DL COMMUNICATION TO EACH STA ?
S912
NO
YES
TRANSMIT DL DATA
S913
RECEIVE ACK FROM STA (INCLUDING RETRANSMISSION PROCESSING)
S914
2

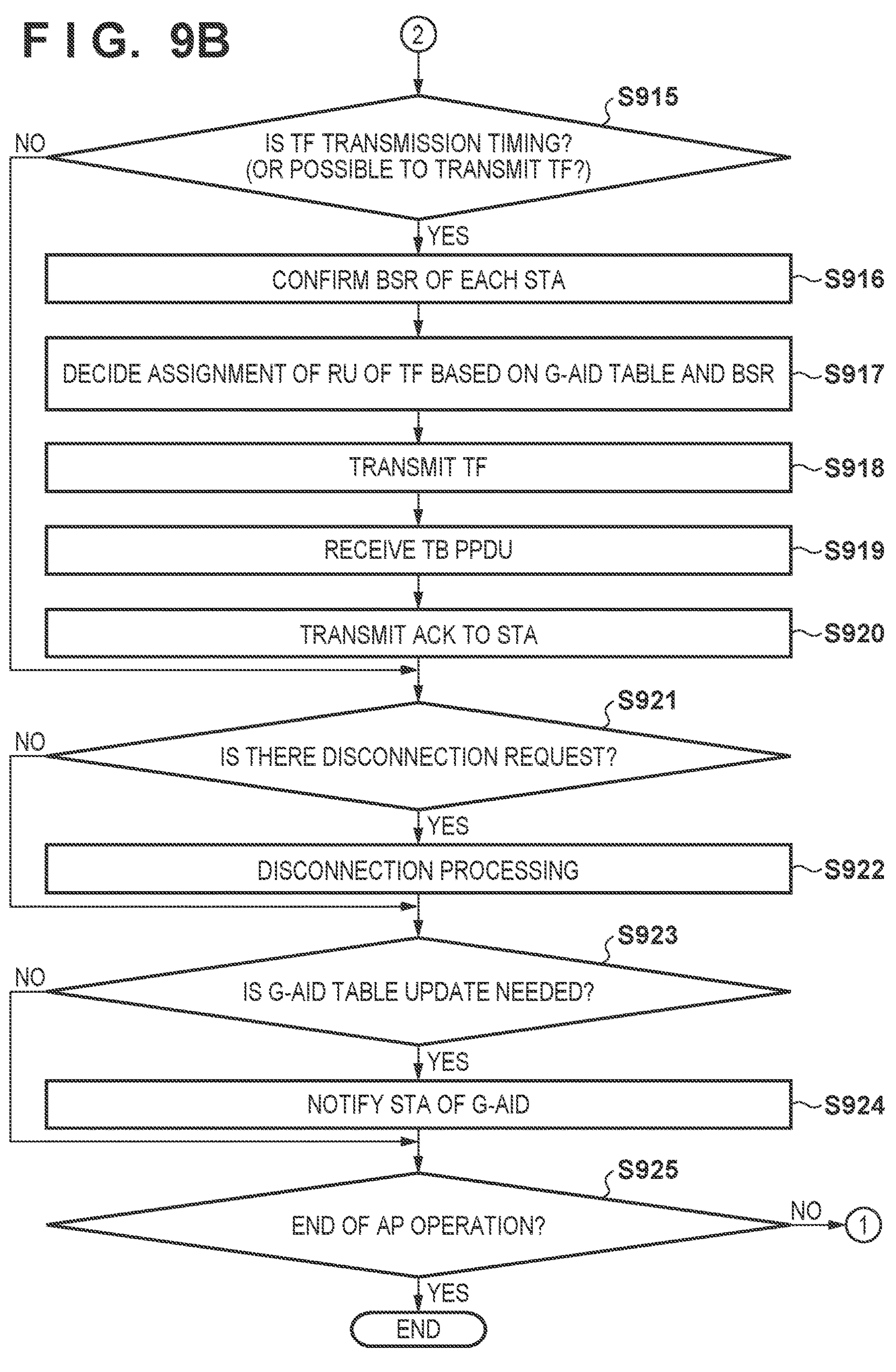
F I G. 9B
2
S915
IS TF TRANSMISSION TIMING?
(OR POSSIBLE TO TRANSMIT TF?)
NO
YES
CONFIRM BSR OF EACH STA
S916
DECIDE ASSIGNMENT OF RU OF TF BASED ON G-AID TABLE AND BSR
S917
TRANSMIT TF
S918
RECEIVE TB PPDU
S919
TRANSMIT ACK TO STA
S920
S921
IS THERE DISCONNECTION REQUEST?
NO
YES
DISCONNECTION PROCESSING
S922
S923
IS G-AID TABLE UPDATE NEEDED?
NO
YES
NOTIFY STA OF G-AID
S924
S925
END OF AP OPERATION?
NO
1
YES
END

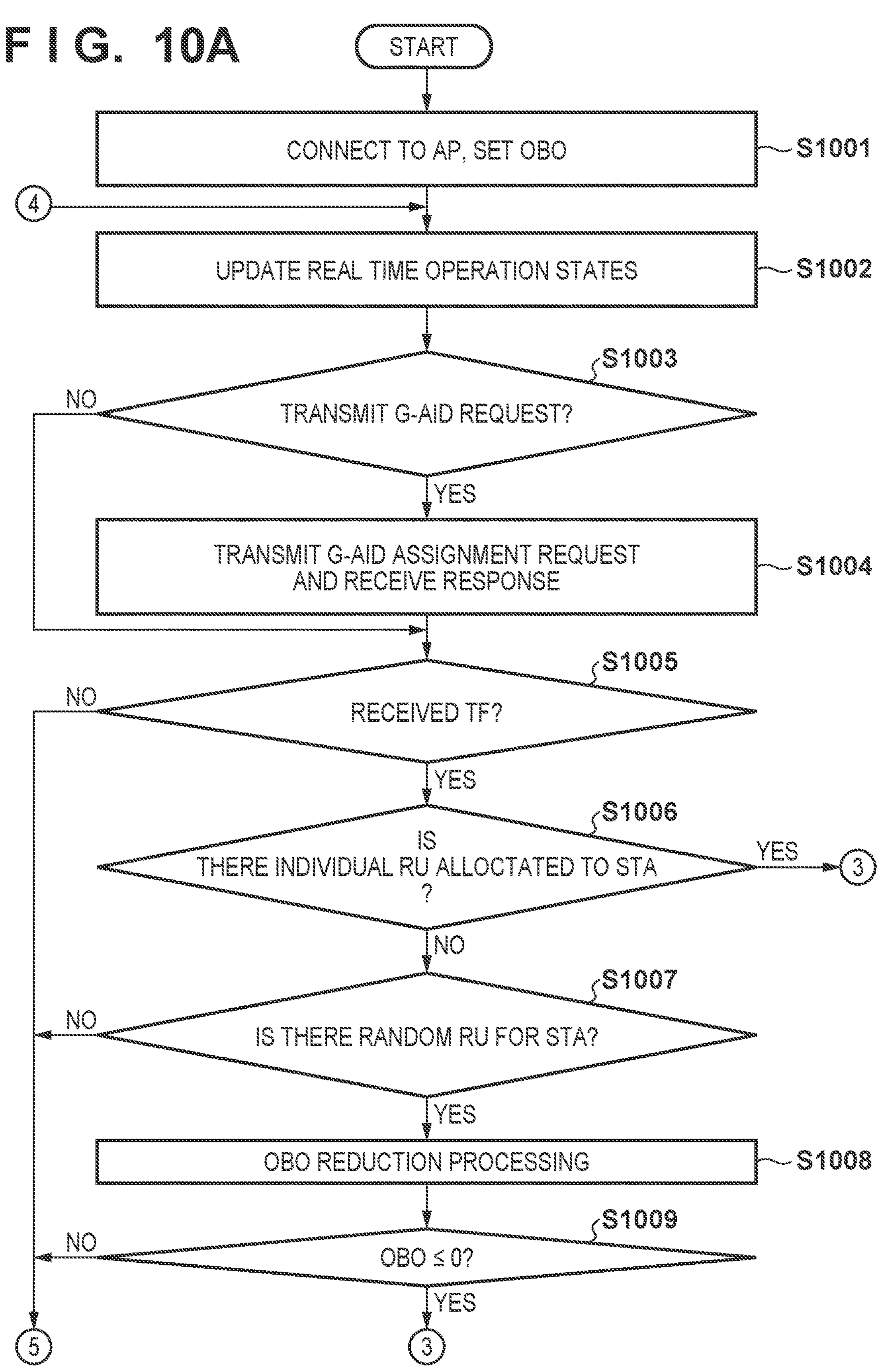
F I G. 10A
START
CONNECT TO AP, SET OBO
S1001
4
UPDATE REAL TIME OPERATION STATES
S1002
S1003
TRANSMIT G-AID REQUEST?
NO
YES
TRANSMIT G-AID ASSIGNMENT REQUEST AND RECEIVE RESPONSE
S1004
S1005
RECEIVED TF?
NO
YES
S1006
IS THERE INDIVIDUAL RU ALLOCTATED TO STA ?
YES
3
NO
S1007
IS THERE RANDOM RU FOR STA?
NO
YES
OBO REDUCTION PROCESSING
S1008
S1009
OBO ≤ 0?
NO
YES
5
3

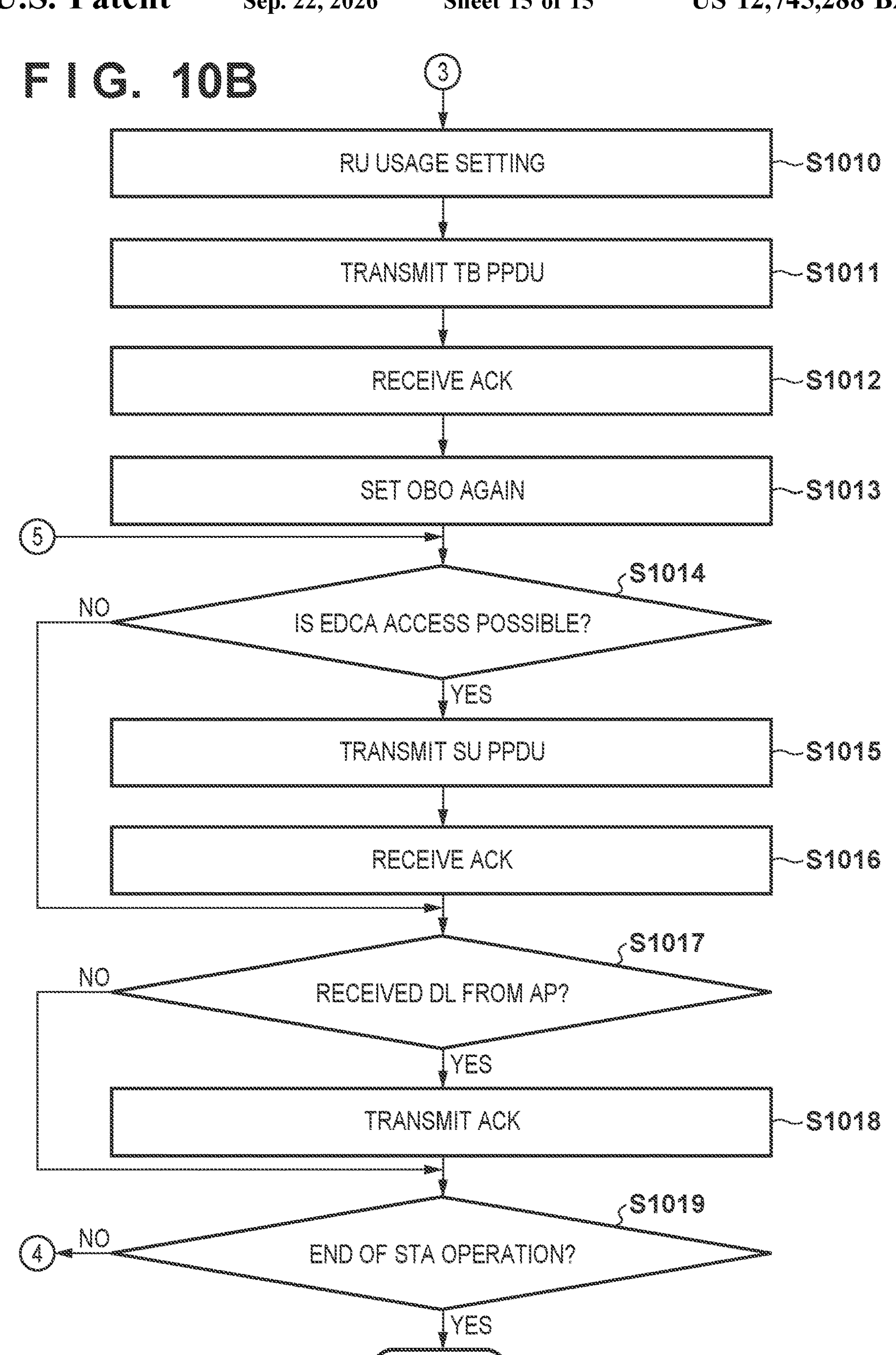
F I G. 10B
3
RU USAGE SETTING
S1010
TRANSMIT TB PPDU
S1011
RECEIVE ACK
S1012
SET OBO AGAIN
S1013
5
S1014
NO
IS EDCA ACCESS POSSIBLE?
YES
TRANSMIT SU PPDU
S1015
RECEIVE ACK
S1016
S1017
NO
RECEIVED DL FROM AP?
YES
TRANSMIT ACK
S1018
S1019
4
NO
END OF STA OPERATION?
YES
END

COMMUNICATION APPARATUS, AND CONTROL METHOD

CROSS-REFERENCE TO RELATED APPLICATIONS

This application is a Continuation of International Patent Application No. PCT/JP2022/036385, filed Sep. 29, 2022, which claims the benefit of Japanese Patent Application No. 2021-164933 filed Oct. 6, 2021, both of which are hereby incorporated by reference herein in their entirety.

BACKGROUND OF THE INVENTION

Field of the Invention

The present invention relates to an access control technique to a wireless medium.

Background Art

As a communication standard concerning a wireless LAN (Wireless Local Area Network), an IEEE (Institute of Electrical and Electronics Engineers) 802.11 standard is known. The IEEE 802.11ax standard as the latest standard of the IEEE 802.11 standard series implements improvement of a communication speed under a congested situation using OFDMA (Orthogonal Frequency-Division Multiple Access), in addition to high peak throughput. The IEEE 802.11ax standard defines a mechanism in which an access point (AP) allocates frequency resources to a plurality of stations (STAs) and transmits data at once using a frame called a trigger frame (TF). This enables communication by OFDMA in uplink (UL) communication in which data is transmitted from an STA to an AP. International Publication No. 2018/047570 discloses a technique of introducing a TF-based random access mechanism in the IEEE 802.11ax standard so that a station returning from sleep or the like can quickly transmit data.

These days, a task group has been established to develop the IEEE 802.11be standard as a successor standard of IEEE 802.11ax in order to further improve the throughput. This task group is examining a technique of performing communications for operations such as automated driving, sensor warning, and machine control with low delay while maintaining high efficiency of use of a wireless medium in a congested environment. These communications need to be performed within, for example, a time as short as possible, so data are presumed to be transmitted by random access. However, if many STAs communicate by random access, random access frequency resources may run short and data may not be transmitted quickly. By simply increasing random access frequency resources, the data transmittable speed may be increased. However, unused frequency resources may be generated and the communication efficiency may decrease.

CITATION LIST

Patent Literature

PTL 1: International Publication No. 2018/047570

SUMMARY OF THE INVENTION

The present invention provides an efficient access control technique to a wireless medium.

A communication apparatus according to one aspect of the present invention comprises a setting unit configured to perform setting of connection between the communication apparatus and another communication apparatus; a reception unit configured to receive from the other communication apparatus a predetermined radio frame including information designating frequency resources for transmitting data from the other communication apparatus to at least one apparatus; and a communication unit configured to, in a case where a first identifier for random access is assigned to the communication apparatus in the setting of the connection, perform communication by acquiring a transmission right of data to the other communication apparatus by random access based on a sum of a first number of frequency resources associated with the first identifier and a second number of frequency resources associated with a second identifier for random access different from the first identifier in the predetermined radio frame.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 6B is a view showing the structure of the Trigger Frame.

FIG. 6C is a view showing the structure of the Trigger Frame.

FIG. 6D is a view showing the structure of the Trigger Frame.

FIG. 7B is a table for explaining OBO subtraction processing.

FIG. 8A is a chart showing an example of a communication sequence.

FIG. 8B is a table for explaining OBO subtraction processing.

FIG. 8C is a table for explaining OBO subtraction processing.

FIG. 9A is a flowchart showing an example of a processing sequence executed by an AP.

FIG. 9B is a flowchart showing the example of the processing sequence executed by the AP.

FIG. 10A is a flowchart showing an example of a processing sequence executed by an STA.

FIG. 10B is a flowchart showing the example of the processing sequence executed by the STA.

DESCRIPTION OF THE EMBODIMENTS

Figure 1:
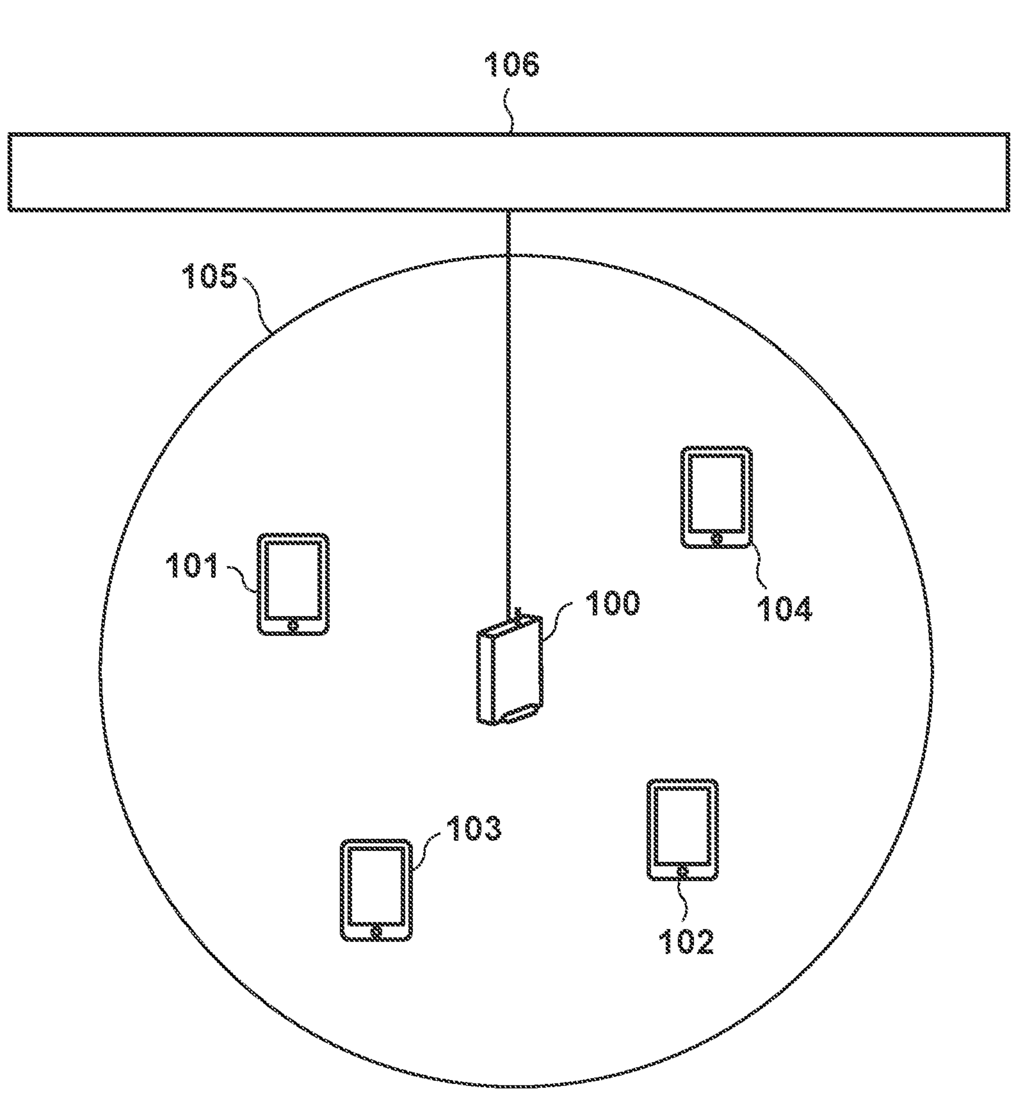
FIG. 1 is a view showing an example of the configuration of a wireless communication system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted. In this specification, terms compliant with IEEE 802.11ax Draft8.0 issued in October 2020. It should be noted that these terms can be interpreted as other terms having similar meanings.

(System Configuration)

An example of the configuration of a wireless communication system according to this embodiment will be described with reference to FIG. 1. This wireless communication system is a wireless communication system in which each access point (AP) forms a network, and performs, for example, a wireless LAN communication complying with the IEEE 802.11 standard series with a currently connected station (STA). Note that FIG. 1 shows only one AP (AP 100), but two or more APs can exist, as a matter of course. Also, FIG. 1 shows four STAs (STAs 101 to 104), but a larger number of STAs or three or less STAs can exist. Note that the AP and the STA only operate as the base station and the terminal of a wireless LAN, respectively, and can be, for example, arbitrary communication apparatuses each capable of operating as both an AP and an STA. In FIG. 1, the AP 100 manages a BSS 105. BSS is an acronym for Basic Service Set and represents a wireless network formed by an AP. Note that the AP 100 can be connected to another BSS or an external network via the DS 106. DS is an acronym for Distribution System. The connection of the DS 106 can be established using a wired line such as Ethernet® or a telephone line. The connection of the DS 106 may be established using a wireless communication line such as LTE (Long Term Evolution) or WiMAX (Worldwide Interoperability for Microwave Access). The connection of the DS 106 may also be established by a wireless LAN complying with the IEEE 802.11 standard. In this case, a radio channel used in the connection of the DS 106 may be the same as or different from a radio channel used between the AP 100 and the STA.

The conventional IEEE 802.11ax standard prepares a mechanism in which an STA copes with TF-based random access. More specifically, the STA includes an OBO (OFDMA based BackOff) counter and subtracts the number of random access frequency resources (resource units: RUs) from the OBO counter in a TF received from an AP. Note that the random access RUs include RUs targeting a connected STA and RUs targeting an unconnected STA. The STA counts the total number of RUs of either type in accordance with the state of the STA. When the total number reaches a predetermined value serving as the initial value of the OBO counter, that is, when the OBO counter reaches 0, the STA acquires the right of access to a random access RU. In this embodiment, this mechanism is sophisticated to assign a special identifier for random access to at least some STAs. The OBO counter is reduced when the STA detects a random access RU corresponding to the connection state of the STA and also when the STA detects a RU corresponding to a random access identifier assigned to the STA. A specific STA assigned with a predetermined identifier for random access can quickly acquire the transmission right in TF-based random access. For example, the predetermined identifier is assigned to an STA to which communication needs to be performed immediately when data is generated. Then, the STA can quickly acquire the random access transmission right.

(Apparatus Arrangement)

Figure 2:
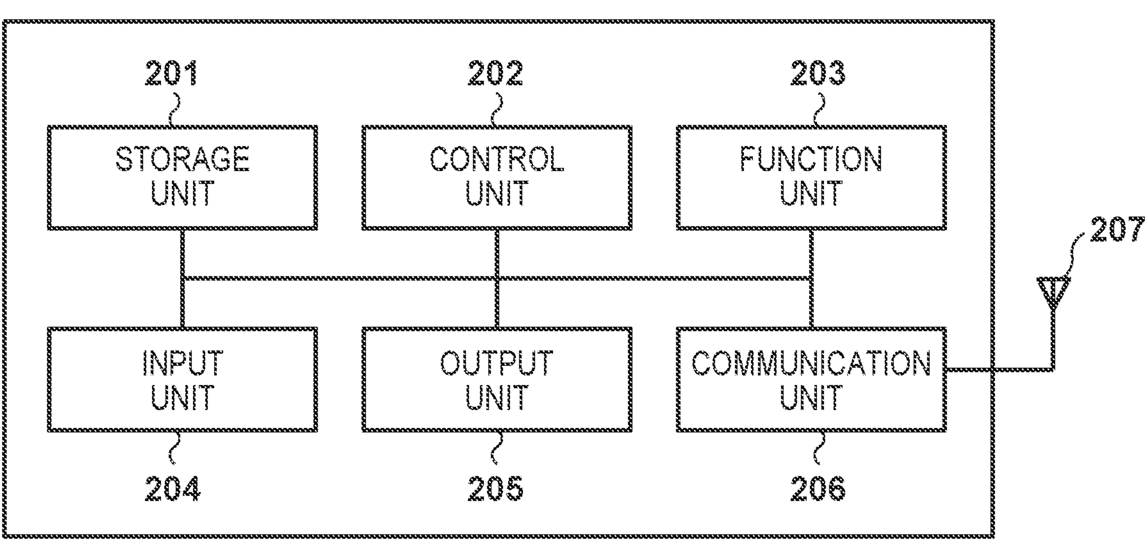
FIG. 2 is a block diagram showing an example of the hardware arrangement of a communication apparatus.

Subsequently, an example of the hardware arrangement of each of the communication apparatuses (APs and STAs) will be described with reference to FIG. 2. The communication apparatus includes, as an example of its hardware arrangement, a storage unit 201, a control unit 202, a function unit 203, an input unit 204, an output unit 205, a communication unit 206, and an antenna 207.

The storage unit 201 is formed by one or more memories including both or one of a ROM and a RAM, and stores programs for performing various kinds of operations to be described later and various kinds of information such as communication parameters for wireless communication. Note that ROM is an acronym for Read Only Memory, and RAM is an acronym for Random Access Memory. Other than the memories such as a ROM and a RAM, a storage medium such as a flexible disk, a hard disk, an optical disk, a magnetooptical disk, a CD-ROM, a CD-R, a magnetic tape, a nonvolatile memory card, or a DVD may be used as the storage unit 201. The storage unit 201 may include storage devices such as a plurality of memories.

The control unit 202 is formed by, for example, one or more processors such as a CPU and an MPU, an ASIC (Application Specific Integrated Circuit), a DSP (Digital Signal Processor), an FPGA (Field Programmable Gate Array), or the like. Here, CPU is an acronym for Central Processing Unit, and MPU is an acronym for Micro Processing Unit. Note that the control unit 202 may be a multi-core processor. The control unit 202 executes the programs stored in the storage unit 201, thereby controlling the entire apparatus. Note that the control unit 202 may control the entire apparatus by cooperation of the programs stored in the storage unit 201 and an OS (Operating System).

In addition, the control unit 202 controls the function unit 203 to execute predetermined processing such as image capturing, printing, or projection. The function unit 203 is hardware used by the apparatus to execute predetermined processing. For example, if the apparatus is a camera, the function unit 203 is an image capturing unit and performs image capturing processing. For example, if the apparatus is a printer, the function unit 203 is a printing unit and performs print processing. For example, if the apparatus is a projector, the function unit 203 is a projection unit and performs projection processing. Data to be processed by the function unit 203 may be data stored in the storage unit 201, or may be data communicated with another AP or STA via the communication unit 206 to be described later. The function unit 203 may include a processing circuit for implementing the AP function or the STA function, and may be configured to execute processing as an AP or STA of the wireless LAN complying with the IEEE 802.11 standard series under the control of the control unit 202.

The input unit 204 accepts various kinds of operations from a user. The output unit 205 performs various kinds of outputs for the user. Here, the output by the output unit 205 includes, for example, at least one of display on a screen, audio output by a loudspeaker, vibration output, and the like. Note that both the input unit 204 and the output unit 205 may be implemented by one module, like a touch panel.

The communication unit 206 controls wireless communication complying with the IEEE 802.11 standard series, or controls IP communication. The communication unit 206 is a so-called radio chip, and may itself include one or more processors and memories. In this embodiment, the communication unit 206 can execute processing complying with at least the IEEE 802.11be standard. In addition, the communication unit 206 controls the antenna 207 to transmit and receive radio signals for wireless communication. The AP and the STA communicate contents such as image data, document data, or video data with another communication apparatus via the communication unit 206. The antenna 207 is an antenna that can transmit and receive signals in at least any one of, for example, a sub-GHz band, 2.4-GHz band, 5-GHz band, and 6-GHz band. Note that the frequency bands (and a combination of frequency bands) to which the antenna 207 is adaptable are not particularly limited. The antenna 207 may be one antenna, or may be a set of two or more antennas to perform MIMO (Multi-Input and Multi-Output) transmission/reception. The antenna 207 may include two or more antennas (two or more sets of antennas) that are adaptable to different frequency bands. Note that FIG. 2 shows one communication unit 206 and one antenna 207 but a plurality of sets of communication units 206 and antennas 207 may be prepared. Alternatively, a plurality of communication units 206 may share one or more antennas 207.

Figure 3:
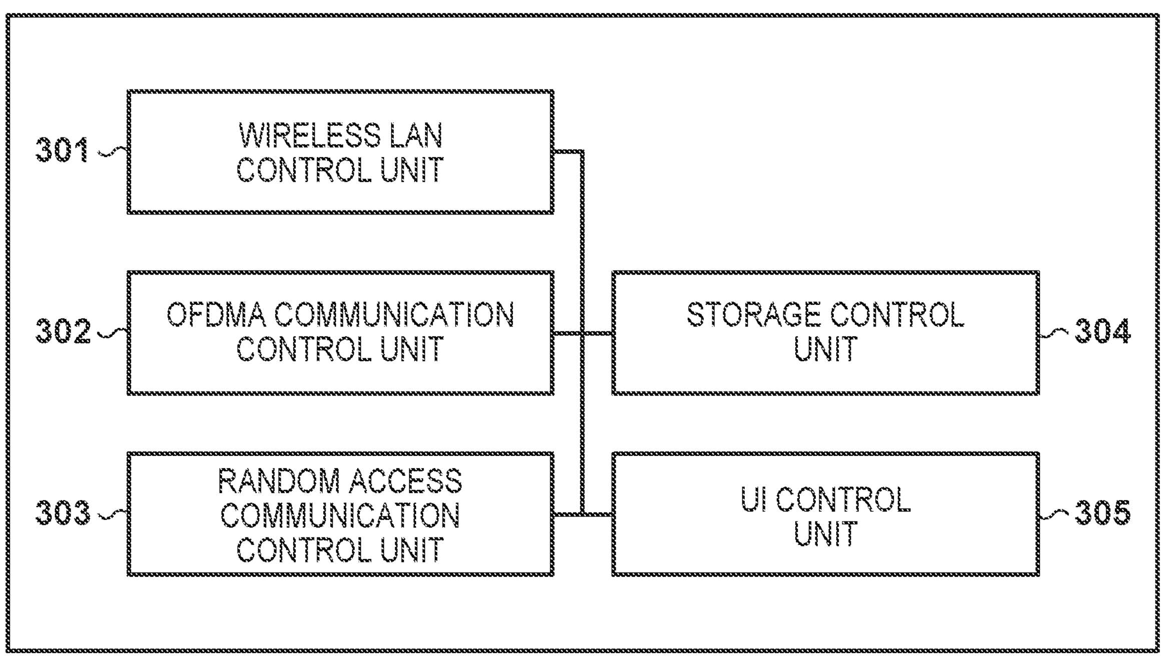
FIG. 3 is a block diagram showing an example of the functional arrangement of the communication apparatus.

Subsequently, an example of the functional arrangement of the communication apparatus (AP and STA) will be described with reference to FIG. 3. The communication apparatus includes, as an example of its functions, a wireless LAN control unit 301, an OFDMA communication control unit 302, a random access communication control unit 303, a storage control unit 304, and a UI control unit 305. Note that these functional units can be implemented by executing a program stored in the storage unit 201 by the control unit 202, but is not limited to this, and some or all of these functions may be implemented by dedicated hardware.

The wireless LAN control unit 301 is configured to control, for example, a circuit for performing transmission and reception of radio signals to and from another communication apparatus (for example, another AP or STA) in a wireless LAN complying with the IEEE 802.11 standard series. The wireless LAN control unit 301 executes communication control of the wireless LAN such as generation and transmission of radio frames complying with the IEEE 802.11 standard series, and reception of radio frames from another communication apparatus. The OFDMA communication control unit 302 executes communication in OFDMA (Orthogonal Frequency-Division Multiple Access) introduced from the IEEE 802.11ax standard. For example, an AP can execute, by the OFDMA communication control unit 302, processing of transmitting data to a plurality of STAs by trigger frames (TFs) in which resource units (RUs) are allocated to the STAs. The STA performs uplink communication by the OFDMA communication control unit 302 using the allocated RU. Note that the concept of random access is adopted in the IEEE 802.11ax standard, a random access RU is prepared, and the RU is used by an STA that acquires the use right based on the above-described OBO counter. The random access communication control unit 303 executes processing concerning the random access in cooperation with the OFDMA communication control unit 302. For example, the AP uses the random access communication control unit 303 to execute setting of a random access RU, notification of setting information of the initial value of the above-described OBO counter to the STA, and the like. The STA can use the random access communication control unit 303 to execute processing such as setting of the OBO counter and subtraction processing upon receiving a TF.

The storage control unit 304 is configured to control storage processing and readout processing of storage devices such as a ROM (Read Only Memory) and a RAM (Random Access Memory) that save programs to be executed by an AP or an STA and various data. The UI control unit 305 controls a user interface (UI) such as a touch panel or a button for accepting an operation to the AP or the STA by the user (not shown) of the AP or STA, and executes operation information obtaining processing and information presentation processing to the user. Note that the UI control unit 305 can execute processing for presenting information such as display of an image or the like or audio output to the user.

(Frame Structure)

The structure of a MAC (Medium Access Control) frame 400 complying with the IEEE 802.11 standard and IEs (Information Elements) as elements of a Frame Body 410 will be described with reference to FIGS. 4A to 4C.

Figure 4A:
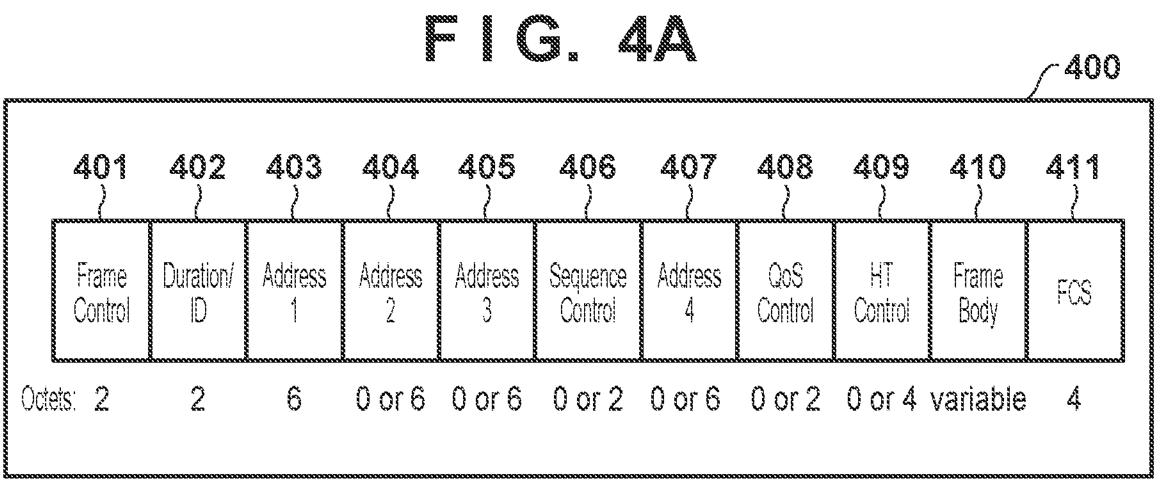
FIG. 4A is a view showing the structure of a MAC frame format.
Figure 4B:
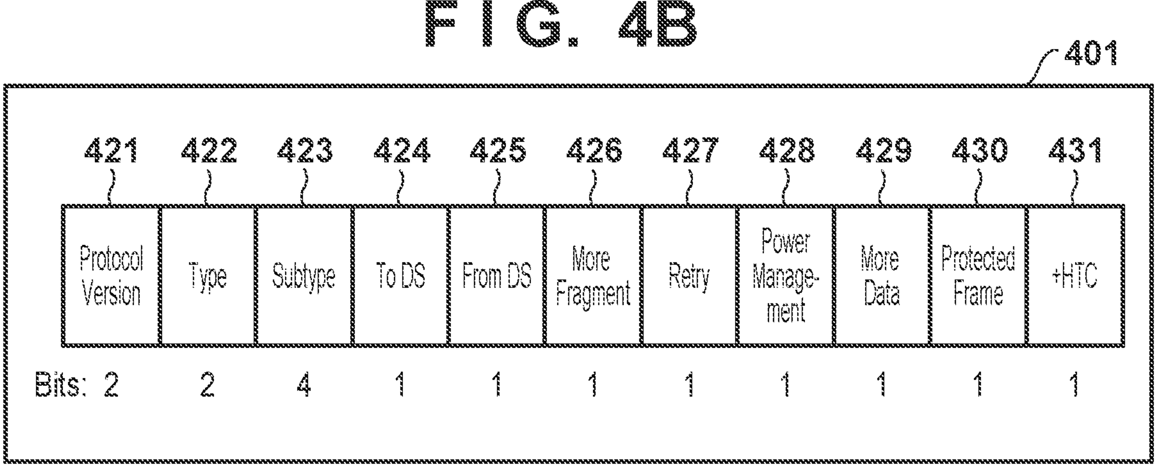
FIG. 4B is a view showing the structure of the MAC frame format.
Figure 4C:
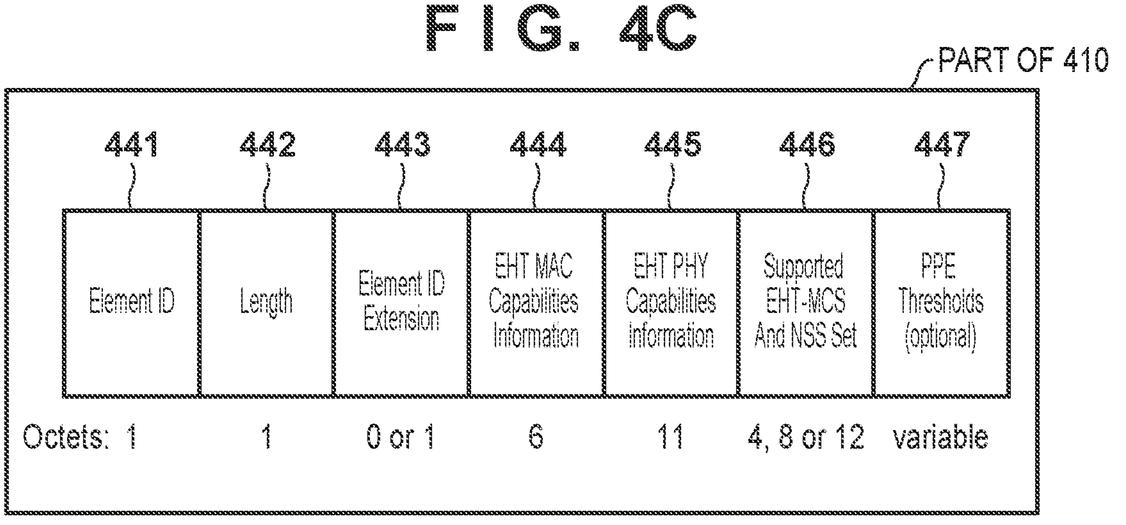
FIG. 4C is a view showing the structure of the MAC frame format.

FIG. 4A shows an example of the overall structure of the MAC frame 400. In the MAC frame 400, a Frame Control 401 is a field concerning control of the overall frame and has a length of 2 octets (16 bits). More specifically, the Frame Control 401 includes subfields to be described later with reference to FIG. 4B. A Duration/ID 402 has a length of 2 octets, and indicates, when an MSB (Most Significant Bits: B15) is "1", a frame length or a time such as a TXOP period by the remaining 15 bits within the range from 0 to 32,767 μs. An Address 403 is a field having a length of 6 octets, and an address such as a BSSID, a transmission source, or a destination is set depending on the type (a Type 422) of the MAC frame. An Address 404, Address 405, and Address 407 are similar fields, but are set, as needed, in accordance with the number of addresses to be indicated. A Sequence Control 406 is a field set with a length of 2 octets, as needed, to store information such as the sequence number of data or the like.

A QoS Control 408 is a field set with a length of 2 octets, as needed, to store information such as a BSR (Buffer Status Report) complying with a standard before IEEE 802.11ax. If a BSR complying with a standard before IEEE 802.11ax is stored, the BSR is represented by two pieces of information. Among the two pieces of information, the first information is a 4-bit TID (Traffic Identifier). In the case of the EDCA access method, a value of 0 to 7 among values indicated by the TID indicates one of four access categories of AC_VO (voice)/AC_VI (video)/AC_BE (best effort)/AC_BK (background). The second information is an 8-bit Queue size. The Queue size is expressed in a unit of 256 octets, and indicates a data amount remaining in the transmission buffer.

An HT Control 409 is a field set with a length of 4 octets, as needed. In the IEEE 802.11ax standard, if the first bit is set to "0", this indicates that this frame is an HT (High Throughput: IEEE 802.11n) frame. If the first two bits are set to 10, this indicates that this frame is a VHT (Very High Throughput: IEEE 802.11ac) frame. If the first two bits are set to 11, this indicates that this frame is an HE (High Efficiency: IEEE 802.11ax) frame. Note that with respect to an EHT (Extremely High Throughput: IEEE 802.11be) frame, it is not decided whether such definition is made.

The Frame Body 410 is a field in which data to be transmitted is stored, and has a length variable depending on the data length. Note that IEs shown in FIG. 4C can be stored as part of the Frame Body 410. An FCS 411 is a frame check sequence in which a bit for error detection is stored.

Subsequently, the contents of the Frame Control 401 will be generally described with reference to FIG. 4B. A Protocol Version 421 is a 2-bit subfield representing the version of a protocol and is set to "0" in the case of an IEEE 802.11 frame. A Type 422 is a 2-bit subfield representing the type of frame and indicates one of Management, Control, and Data frames. A Subtype 423 is a 4-bit subfield in which information more finely classifying the type of Management, Control, or Data is stored. A To DS 424 is a 1-bit subfield representing whether the destination of the frame is a DS (Distribution System). A From DS 425 is a 1-bit subfield representing whether the transmission source of the frame is a DS. A More Fragment 426 is a 1-bit subfield representing whether the frame is part of a fragment. A Retry 427 is a 1-bit subfield representing whether previously transmitted data is retransmitted. A Power Management 428 is a 1-bit subfield representing whether the STA is in the power saving mode. A More Data 429 is a 1-bit subfield representing whether there is further transmission data after data transmitted by a current frame. A Protected Frame 430 is a 1-bit subfield representing whether the frame is protected by encryption. A +HTC 431 is a 1-bit subfield representing whether, for example, the HT Control 409 is included.

Next, the structure of IEs included in the Frame Body 410 will be generally described with reference to FIG. 4C. FIG. 4C particularly shows the structure of an EHT Capabilities element. An Element ID 441 stores the identifier of the IE. A value concerning the EHT in IEEE 802.11be inherits the value of a HE Capabilities element in IEEE 802.11ax and is, for example, 255. A Length 442 indicates the length of the information element. An Element ID Extension 443 stores the identifier of an IE set as needed. For example, values corresponding to an EHT Capabilities element concerning capability information and an EHT Operation element concerning operation information are newly defined, and these values can be stored in the Element ID Extension 443.

An EHT MAC Capabilities Information 444 stores information about the capabilities of the MAC layer. An EHT PHY Capabilities Information 445 stores information about the capabilities of the physical (PHY) layer. A Supported EHT-MCS And NSS Set 446 stores a value representing a supported modulation and coding scheme (MCS) and the number of spatial streams (NSS). A PPE (Physical layer Packet Extension) Thresholds 447 is optional information.

Note that, as an example, a field representing whether there is the capability of random access (to be referred to as extended random access hereinafter) extended by this embodiment can be defined in the EHT MAC Capabilities Information 444. Based on this value (or bit), an AP and an STA exchange their capabilities. An AP having this capability can assign a predetermined identifier (AID) for extended random access to an STA, and further indicate the presence of an extended random access RU in a trigger frame (TF). Note that AID stands for Association ID. An STA having this capability can request assignment of an extended random access AID from an AP, and interpret a TF to specify a RU directed to the STA. Details of processing executed by the AP and the STA will be described later.

Figure 5:
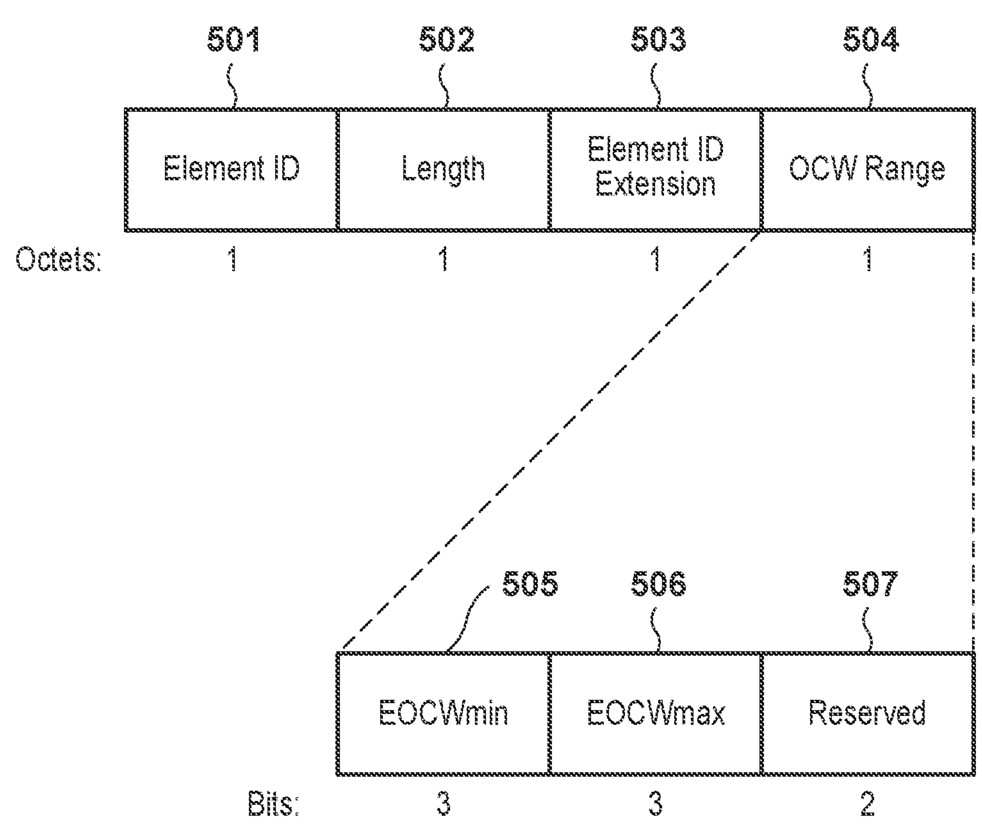
FIG. 5 is a view showing an example of the structure of a UORA Parameter Set element.

FIG. 5 shows the structure of a UORA Parameter Set element. UORA is an acronym for Uplink OFDMA based Random Access. This information element can be used to announce setting information about the initial value of the above-described OBO counter. That is, this information element notifies an STA of information for setting the range (this range is called OCW) of values EOCWmin and EOCWmax available as initial values of the OBO counter. Note that OCW is an acronym for OFDMA Contention Window, and "E" of EOCW means Exponent. The minimum value OCWmin of an actual OCW is calculated by $OCWmin=2^{EOCWmin}-1$, and the maximum value OCWmax of the OCW is calculated by $OCWmax=2^{EOCWmax}-1$.

Each of an Element ID 501 and an Element ID Extension 503 has a 1-octet length and is a field in which a value representing that the information element is a UORA Parameter Set element is stored. A value "255" is stored in the Element ID 501, and a value "37" is stored in the Element ID Extension 503. A Length 502 stores a value representing the length of the information element. An OCW Range 504 is a field having a length of 1 octet to announce the above-mentioned EOCWmin and EOCWmax. The OCW Range 504 includes an EOCWmin subfield 505 and an EOCWmax subfield 506 representing the above-described EOCWmin and EOCWmax each by 3 bits. The EOCWmin subfield 505 is arranged at bit positions B0 to B2 of the OCW Range 504, and the EOCWmax subfield 506 is arranged at bit positions B3 to B5 of the OCW Range 504. The remaining two bits of the OCW Range 504 are reserved bits (Reserved 507).

Subsequently, the structure of a TF 600 will be explained with reference to FIGS. 6A to 6D. The TF is a kind of control frame introduced from IEEE 802.11ax and is a frame used to designate a necessary activation timing when simultaneously transmitting frames from a plurality of STAs to an AP. Note that a RU and a MCS (Modulation and Coding Scheme) used for frame transmission are also indicated in the TF. Although a change of the structure of the TF is examined in the IEEE 802.11be standard, the following description complies with the structure and names in the IEEE 802.11ax standard. The frame structure described below can therefore be changed as long as the method according to this embodiment can be implemented. For example, some or all of fields described below can be omitted or replaced with fields of other names, and one field can be divided into a plurality of fields or a plurality of fields can be integrated into one field.

Figure 6A:
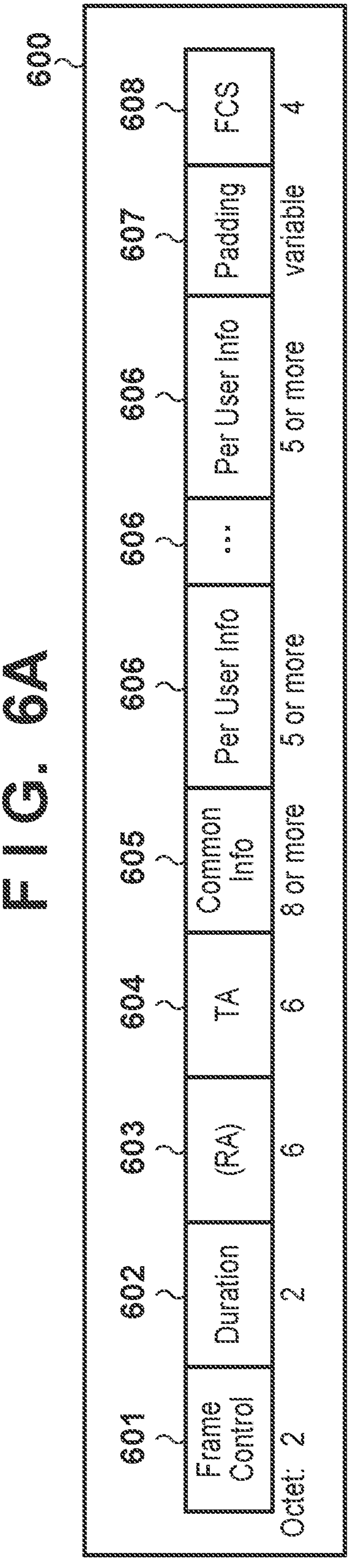
FIG. 6A is a view showing the structure of a Trigger Frame.

In the TF 600 shown in FIG. 6A, a Frame Control 601 is a field in which a value representing a Trigger Frame of the IEEE 802.11ax standard (or the IEEE 802.11be standard) is stored. Note that the length of the Frame Control 601 is 2 octets. A Duration 602 is a field with a length of 2 octets. ARA 603 is a field with a length of 6 octets in which a Receiver Address is stored. A TA 604 is a field with a length of 6 octets in which a Transmitter Address is stored. A Common Info 605 is a field representing information common to a plurality of terminals serving as destinations of the TF and has a length of 8 octets or more. Details of the Common Info 605 will be described later with reference to FIGS. 6B and 6C. A Per User Info 606 is a field representing individual information to the destination of the TF and has a length of 5 octets or more. Details of the Per User Info 606 will be described later with reference to FIG. 6D. A Padding 607 is a padding area of a variable length used to give a time margin to an STA that has received the TF. The AP decides this time margin based on a time (MinTrigProcTime) necessary for each STA to process the Per User Info 606 associated with the STA in the TF. In general, the AP prepares the Padding 607 of a length corresponding to the maximum value of the MinTrigProcTime for each of STAs serving as destinations of the TF. A FCS 608 is a Frame Check Sequence added for error detection/correction.

Next, details of the Common Info 605 will be explained with reference to FIG. 6B. A Trigger Type 611 is a subfield having a length of 4 bits, and the type of trigger is specified in accordance with the value of the Trigger Type 611, as shown in the table of FIG. 6C. As shown in the table, for a Basic TF, "0" is set in the Trigger Type 611. A Length 612 is a 12-bit subfield representing the time (duration) of response data to the TF. A value set in the Length 612 is reflected in the L-SIG field of the physical layer in a frame of the IEEE 802.11 standard series. Information represented by the L-SIG includes the duration time of a frame having the field.

Each of a More TF 613 and a CS (Carrier Sense) Required 614 is a subfield having a length of 1 bit. A UL BW (Bandwidth) 615 is a subfield having a length of 2 bits, and a frequency bandwidth used in an uplink (UL) is specified in accordance with the value of the UL BW 615. For example, when the frequency bandwidth used is 20 MHz, the value of the BW 615 is set to 0. A GI And HE-LTF Type (Guard Interval And High-Efficiency Long Training Field) 616 is a subfield having a length of 2 bits. A MU-MIMO LTF Mode 617 and a Number of HE-LTF Symbols And Midamble Periodicity 618 are subfields having lengths of 1 bit and 3 bits, respectively. A UL STBC (Space Time Block Code) 619 is a subfield having a length of 1 bit. An LDPC (Low Density Parity Check) Extra Symbol Segment 620 is a subfield that is arranged after, for example, the UL STBC 619 and has a length of 1 bit. An AP TX Power 621 is a subfield having a length of 6 bits. A Pre-FEC Padding Factor Packet 622 and a PE Disambiguity 623 are subfields having lengths of 2 bits and 1 bit, respectively. A UL Spatial Reuse 624 is a subfield having a length of 16 bits. A Doppler 625 is a subfield having a length of 1 bit. A UL HE-SIG-A Reserved 626 is a subfield having a length of 9 bits. A Reserved 627 is a subfield having a length of 1 bit.

A Trigger Dependent Common Info 628 is a subfield whose length is variable (variable length). The Trigger Dependent Common Info 628 can indicate additional information corresponding to the Trigger Type 611.

Note that a HE (High Efficiency)-added subfield mentioned above is a subfield for the IEEE 802.11ax standard, as its name suggests. For a TF of the IEEE 802.11be standard, a term such as "EHT" can be used as the name of the subfield, instead of "HE".

Next, details of the Per User Info 606 will be explained with reference to FIG. 6D.

An AID 12 631 is a 12-bit subfield used to represent the AID of the destination of the TF. An STA having the same AID value as a value stored in the AID 12 is the destination of the Per User Info 606, and the STA is permitted to use an allocated RU for data transmission. Note that the STA can determine whether the RU is directed to the STA, based on whether the LSBs (Least Significant Bits) of the AID 12 coincides with an AID assigned to the STA at the time of connection. At this time, AID 12=0 indicates that the RU is directed to not a specific terminal but an arbitrary STA associated with (connected to) the AP. That is, AID 12=0 indicates that the RU represented by the Per User Info 606 is for random access by the STA connected to the AP. Further, AID 12=2045 indicates that the RU represented by the Per User Info 606 is directed to an arbitrary STA not connected to the AP. That is, an unconnected STA can transmit data when it acquires the transmission right in random access in the RU represented by the Per User Info 606 with AID 12=2045. Also, AID 12=2046 indicates that the RU represented by the Per User Info 606 including the AID 12 is not allocated.

In this embodiment, some values from 2008 to 2044 and 2047 to 4094, which are Reserved values of the AID 12 in the IEEE 802.11ax standard, are newly defined as extended random access AIDS. The extended random access AID will be called a G-AID. For example, the same G-AID may be assigned to a plurality of STAs that should acquire the right of access to a random access RU in a similar order of priority. The G-AID may be called a Group-AID, Enhanced-AID, E-ADI, or the like. In the IEEE 802.11be standard, no official name is added to this AID at present.

A RU Allocation 632 is a 8-bit subfield representing the index of a RU allocated by the Per User Info 606. A UL FEC Coding Type 633 is a 1-bit subfield representing a coding type used for a radio frame transmitted as a response to the TF. AUL MCS 634 is a 4-bit subfield representing a coding scheme used for a radio frame transmitted as a response to the TF. A UL DCM 635 is a 1-bit subfield representing the Dual Carrier Modulation of a radio frame transmitted as a response to the TF. When the AID 12 is not for random access, an SS Allocation/RA-RU Information 636 indicates the spatial stream of a frame transmitted as a response to the TF. When the AID 12 is for random access, the SS Allocation/RA-RU Information 636 indicates a RA-RU (Random Access Resource Unit). The SS Allocation/RA-RU Information 636 is a 6-bit subfield. A UL Target RSSI 637 is a 7-bit subfield representing reception power in the AP for a radio frame transmitted as a response to the TF. A Reserved 638 is a reserved area. A Trigger Dependent User Info 639 is a subfield having a variable number of bit in which contents change depending on the Trigger Type 611.

(Processing Sequence)

Subsequently, an example of a communication sequence when the extended random access according to this embodiment is used will be explained.

Processing Example 1

A sequence example of the first communication processing will be explained with reference to FIG. 7A. In this example, first, the AP 100 performs initial setting as an access point (S701). For example, the AP 100 decides values of the OCW Range (EOCWmin 505 and EOCWmax 506) in the UORA Parameter Set. Also, the AP 100 decides whether to perform communication corresponding to the extended random access method. Here, the AP 100 decides to perform communication corresponding to the extended random access method. Then, the AP 100 initializes a G-AID table (S702). The G-AID table is, for example, information that associates an STA (terminal) connected/managed by the AP 100 with the extended random access G-AID.

After that, the STA 101 is connected to the AP 100 (S703). If the STA 101 requests assignment of the G-AID and the AP 100 decides to, for example, accept the request, the AP 100 assigns the G-AID value to the STA 101. The STA 101 can transmit, to the AP 100, G-AID request information included in a Management Frame at the time of connection, such as a search request Probe Request or a connection request Association Request. The AP 100 can transmit a G-AID value included in an Association Response. For the request and assignment of the G-AID value, a G-AID element can be newly defined in a constituent entry of the Management frame. Here, the G-AID value=2040 is assigned to the STA 101. In accordance with the assignment of the G-AID value to the STA 101, the AP 100 updates the G-AID table (S704). Thereafter, the AP 100 updates the G-AID table when another STA is connected, a connected STA is disconnected, or the G-AID of any STA is updated.

On the other hand, the STA 102 is connected to the AP 100 without requesting assignment of an extended random access G-AID (S705). The STA 103 requests assignment of an extended random access G-AID, is assigned with a G-AID, and establishes a connection with the AP 100 (S706). Note that the STA 104 is kept unconnected.

The AP 100 periodically sends, for example, a Beacon including a UORA element (S707). For example, when the EOCWmin 505 or the EOCWmax 506 is changed, the AP 100 can transmit the information after the change that is included in the UORA element. That is, surrounding STAs can be notified of the latest UORA element by a periodically transmitted Beacon. When the UORA element is changed in the received Beacon, the STAs 101 to 104 initialize and update the OBO counters managed by themselves. For example, when a UORA element is received for the first time or is different from a previously received UORA element, the STAs 101 to 104 initialize and update the OBO counters. In other words, when the UORA element is not changed, no OBO counter is initialized and updated. Note that the STA 104 is kept unconnected and need not initialize the OBO counter.

After that, the AP 100 transmits the TF described with reference to FIGS. 6A to 6D (S709). In response to the reception of the TF, the STAs 101 to 104 execute OBO counter subtraction processing.

This processing will be explained with reference to FIG. 7B. In the table of FIG. 7B, a row 721 indicates G-AIDs respectively assigned to the STAs 101 to 104. In this case, G-AID=2040 is assigned to the STAs 101 and 103, and no G-AID is assigned to the STAs 102 and 104. A row 722 indicates the value of the OBO counter held in each of the STAs 101 to 104 before receiving the TF. That is, the STAs 101 to 103 have OBO=3 upon receiving the TF, and the STA 104 has OBO=2 upon receiving the TF. For descriptive convenience, the OBO counters of the STAs 101 to 103 have the same initial value. However, these values are decided from a range designated by EOCWmin and EOCWmax, and may be the same value or different values. A column 723 indicates the value of the AID 12 corresponding to each of URs included in the TF received by the STAs 101 to 104. That is, RU1 is associated with AID 12=0, RU2 and RU3 are associated with AID 12=2040, and RU4 is associated with AID 12=2045. A region 724 indicates a RU subjected to subtraction upon receiving the TF, and the result of updating the OBO counter by the subtraction.

In the example of FIG. 7B, as described above, the TF includes one RU with AID 12=0, two RUs with AID 12=2040, and one RU with AID 12=2045. Following the IEEE 802.11ax standard, the RU with AID 12=0 indicates a random access RU targeting a connected STA, and the RU with AID 12=2045 indicates a random access RU targeting an unconnected STA. That is, like the IEEE 802.11ax standard, AID 12=0 is used for random access targeting a connected STA, and AID 12=2045 is used for random access targeting an unconnected STA. In addition, according to this embodiment, a RU with an AID 12 value of at least one of 2008 to 2044 and 2047 to 4094 is used as an extended random access RU. Here, AID 12=2040 is used for extended random access.

When STAs assigned with extended random access G-AID=2040, like the STAs 101 and 103, detect extended random access RUs coincident with the G-AID of the STA, they subtract the number of detected RUs from their OBO counter values. Also, when these STAs detect conventional RUs with AID 12=0 targeting a connected STA, they subtract the number of detected RUs from their OBO counter values. That is, in the example of FIG. 7B, the STAs 101 and 103 subtract "3", which is a sum of the number of RUs with AID 12=0 and the number of RUs with AID 12=2040, from the OBO counter values. As a result, the STAs 101 and 103 acquire the data transmission right (right of access to a wireless medium). The STAs 101 and 103 then perform communication (uplink data transmission) with the AP 100 using a RU arbitrarily selected from the random access RUs (RU1 to RU3) subjected to the subtraction processing. For example, the STA 101 can transmit data using RU1 as a result of selecting a RU from RU1 to RU3 at random. The STA 103 can transmit data using RU3 as a result of selecting a RU from RU1 to RU3 at random. It should be noted that if the STAs 101 and 103 use the same RU as a result of random RU selection, radio frames transmitted from the STAs 101 and 103 can collide with each other, similar to a conventional random access mechanism. In this manner, the STAs 101 and 103 handle without distinction a RU with AID 12=0 available even by an STA having no G-AID setting, and a RU with AID 12=2040 corresponding to a G-AID set for the STA. However, this is merely an example. For example, these RUs are not distinguished in OBO counter value subtraction processing, but when selecting a RU to be used, are distinguished by giving priority to a RU with AID 12=2040.

In contrast, the STA 102 is not assigned with a G-AID, even if it detects RU2 and RU3, does not reduce the OBO counter value, and subtracts only 1 from the OBO counter based on RU1 with AID 12=0 serving as a random access RU for a connected STA. The STA 104 is not connected, and subtracts only 1 from the OBO counter based on RU4 with AID 12=2045 serving as a random access RU for an unconnected STA. The STAs 102 and 104 not assigned with a G-AID performs an operation similar to TF-based random access in the conventional IEEE 802.11ax standard.

Figure 7A:
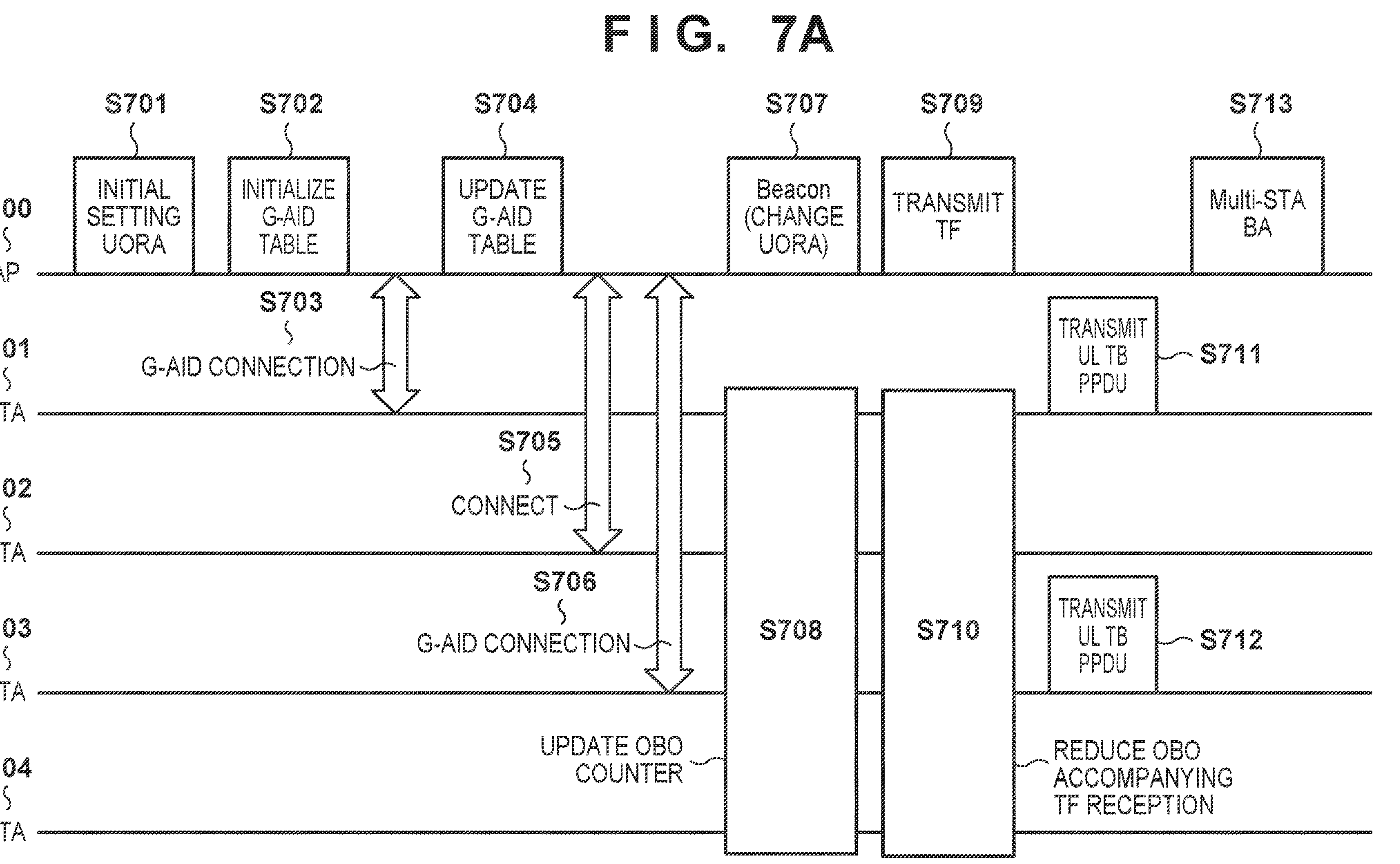
FIG. 7A is a chart showing an example of a communication sequence.

Referring back to the description of FIG. 7A, the STAs 101 and 103 select RU1 and RU3, respectively, and transmit data (UL TB PPDU), as described above (S711 and S712). Note that UL TB PPDU stands for UpLink Trigger based Physical layer Protocol Data Unit and is a PPDU transmitted from an STA to an AP based on a TF. If the reception of data is successful, the AP 100 transmits a Multi-STA BA (Block-Ack) to the STAs 101 and 103 serving as data transmission sources (S713).

In this embodiment, for example, a G-AID as a random access AID is assigned to, for example, an STA that needs to quickly acquire the right of access to a random access RU. An AP transmits a TF in which a RU corresponding to the G-AID is set, and causes the STA, in which the G-AID is set, to decrement the OBO counter without causing an STA, in which no G-AID is set, to decrement the OBO counter. The OBO counter value of the STA in which the G-AID is set quickly reaches 0, and the STA can acquire the right of access to a random access resource. In an example, the first OBO counter for normal random access and the second OBO counter for the G-AID may be prepared for an STA. For example, a small initial value is set in the G-AID counter so that an STA assigned with a G-AID can quickly access a random access RU. Especially when the number of G-AID types is small, it can be useful to prepare and manage a plurality of counters. However, if a counter is prepared for each G-AID, parameter setting for setting the initial value of each counter, management of the counter, and the like can become cumbersome as the number of G-AID types increases. In this case, it is useful to prepare only one OBO counter, and count at once the total number of first RUs corresponding to a G-AID and second RUs for random access (for a connected STA) not corresponding to a G-AID, as described above. That is, the above-described processing can adjust the easiness of acquiring the right of access to a random access RU for each STA without complicating the configuration of the STA. It is sufficient to newly add only handling of the G-AID. This can suppress the influence of updating an STA compliant with the IEEE 802.11ax standard to comply with the IEEE 802.11be standard.

Processing Example 2

Subsequently, an example of a communication sequence when a plurality of extended random access G-AIDs are used will be explained with reference to FIGS. 8A and 8B. Processing in FIG. 8A is performed, for example, after S713 of FIG. 7A.

In FIG. 8A, first, the connected STA 102 transmits a G-AID assignment request to the AP 100 (S801). For example, the STA 102 transmits the G-AID assignment request to the AP 100 by executing a ReAssociation procedure. The STA 102 may transmit the G-AID assignment request to the AP 100 by executing, for example, a newly defined Action frame procedure. The newly defined Action frame procedure can be an extended procedure of, for example, an ADDTS (ADD Traffic Stream) procedure. The STA 102 may transmit the G-AID assignment request to the AP 100 by a newly defined procedure of the HT Control 409 of a MAC frame or a newly defined OMI (Operation Mode Indication) procedure. Any of these procedures is executed between an AP and STA having the extended random access capability.

Upon receiving the G-AID assignment request from the STA 102, the AP 100 adjusts assignment of a G-AID (S802). The AP 100 can execute, for example, at least one of determination of whether to assign a G-AID to the STA 102 and determination of how to perform priority control with other STAs. In this example, the AP 100 decides to assign a G-AID to the STA 102 and give the STA 101 an access right higher in priority than those for the STAs 102 and 103. Based on the result of adjustment, the AP 100 transmits to the STA 102 a G-AID assignment response including information representing an assigned G-AID (S803). By this response, for example, an extended random access G-AID=2040 is assigned to the STA 102. The AP 100 transmits to the STA 101 information representing the update of assignment of the G-AID (S804). This information includes information representing that G-AID=2041 is assigned to the STA 101, in addition to the previously assigned G-AID=2040. Here, the AP 100 may transmit to the STA 101 information representing both G-AID=2040 and G-AID=2041, or transmit to the STA 101 information representing G-AID=2041 and information representing additional assignment of the G-AID.

The AP 100 periodically sends a Beacon including a UORA element (S805). At this time, if the UORA element is updated, the updated UORA element is announced by the Beacon. The STAs 101 to 104 update the OBO counters (S806). Then, the AP 100 transmits a TF (S807), and the STAs 101 to 104 execute OBO counter subtraction processing based on the TF (S808).

The OBO counter subtraction processing in this processing example will be explained with reference to FIG. 8B. As described above, G-AID=2040 and 2041 are assigned to the STA 101. Every time the STA 101 detects a RU associated with AID 12=0 or 2040 or AID 12=2041, it performs OBO counter subtraction processing. That is, the STA 101 reduces the OBO counter in response to detection of a RU with AID 12=0 or 2040, and also when it detects a RU with AID 12=2041, reduces the OBO counter. In contrast, the STAs 102 and 103 reduces the OBO counters in response to detection of a RU with AID 12=0 or 2040, but even when they detect a RU with AID 12=2041, do not reduce the OBO counters.

Assume that in S807, the AP 100 transmits a TF in which the AID 12 of RU3 is set to 2041, as shown in FIG. 8B, unlike FIG. 7B. The STA 101 reduces the OBO counter based on RU1 and RU2 with AID 12=0 or 2040, reduces the OBO counter based on RU3 with AID 12=2041, and acquires the right of access to a random access RU. In contrast, the STAs 102 and 103 reduce the OBO counters based on RU1 and RU2 with AID 12=0 or 2040, but do not reduce the OBO counters based on RU3 with AID 12=2041. In this stage, the STAs 102 and 103 do not acquire the right of access to a random access RU. Note that processing by the STA 104 is similar to that in FIG. 7B.

Upon acquiring the access right, the STA 101 selects one RU from RU1 to RU3 and transmits a UL TB PPDU (S809). The AP 100 then transmits a BA (S810).

As described above, in this processing example, a plurality of G-AIDs can be set, and a specific STA can preferentially acquire the right of access to an extended random access RU. For example, between the first communication very sensitive to a delay until the access right is acquired, and the second communication permitting sensitivity to a certain degree, the first communication more easily acquires the right of access to a random access RU. According to this processing example, control of prioritization of acquiring the right of access to a random access RU can be easily executed in accordance with various use cases.

Processing Example 3

In processing example 2, for example, G-AID=2040 and 2041 are assigned to the STA 101 to accelerate reduction of the OBO counter of the STA 101 in comparison with the remaining STAs. In processing example 3, superiority is set in advance for a plurality of G-AIDs, instead of assigning a plurality of G-AIDs. An STA executes OBO counter subtraction processing in response to detection of a RU corresponding to an assigned G-AID, and executes OBO counter subtraction processing in response to detection of a RU corresponding to another G-AID inferior to the G-AID. For example, an STA assigned with G-AID=2041 reduces the OBO counter based on a RU corresponding to G-AID=2041, and reduces the OBO counter based on a RU corresponding to G-AID=0 or 2040. For example, as shown in FIG. 8C, only G-AID=2041 is assigned to the STA 101. For example, in S804 of FIG. 8A, the AP 100 notifies the STA 101 of only G-AID=2041. The STA 101 manages only G-AID=2041 as a G-AID assigned to the STA 101. Note that in initial assignment of a G-AID, the AP may notify the STA of information representing the priority of the G-AID value. Alternatively, when connection is established, the AP may notify the STA of the information regardless of whether a G-AID is assigned.

As shown in FIG. 8C, the STA 101 reduces the OBO counter based on RU1 with AID 12=0 and RU3 with AID 12=2041, and reducest the OBO counter based on RU2 with AID 12=2040. That is, the STA 101 executes OBO counter subtraction processing based on not only a RU corresponding to G-AID=2041 assigned to the STA 101 but also a RU corresponding to G-AID=2040 lower in priority than G-AID=2041. On the other hand, the STAs 102 and 103 are assigned with G-AID=2040 and do not perform OBO counter subtraction processing based on a RU with G-AID=2041 higher in priority than the G-AID.

In this example, a G-AID of a large numerical value is higher in priority than a G-AID of a small numerical value, but a G-AID of a small numerical value may be preferential. For example, arbitrary prioritization may be performed such that G-AID=2040 is higher in priority than G-AID=2042 and 2044 but lower than G-AID=2041. According to this processing example, only one G-AID is assigned to an STA, unlike processing example 2, and the processing can be further simplified. In particular, as the range of numerical values usable as a G-AID becomes wider, this processing can more simplify the setting of an STA by an AP, and the STA can more easily manage an assigned G-AID.

(Processing Sequence Executed by AP)

Subsequently, an example of a processing sequence executed by the AP 100 will be explained with reference to FIGS. 9A and 9B. This processing can be implemented by, for example, executing a computer program stored in the storage unit 201 of the AP 100 by the control unit 202. However, this is merely an example, and part or all of the following processing may be executed by dedicated hardware. This processing can be executed when, for example, the AP 100 is turned on or a setting to start processing for extended random access as described above by the AP 100 is performed.

First, the AP 100 decides a UORA parameter (step S901). For example, the AP 100 accepts a setting operation from the user of the AP 100 and decides a UORA parameter. Note that when, for example, the setting operation is not performed, the AP 100 may use as a UORA parameter a default value defined in the IEEE 802.11ax standard or the IEEE 802.11be standard. The AP 100 may calculate a UORA parameter in accordance with a predetermined rule. Then, the AP 100 initializes the G-AID table. The G-AID table can be information representing the identifier of an STA assigned with a G-AID or whether a G-AID is assigned to each STA, and information that associates a G-AID with a G-AID-assigned STA.

After the initial setting in steps S901 and S902 ends, the AP 100 periodically transmits a Beacon at the transmission timing of the Beacon (YES in step S903) (step S904). The Beacon includes a UORA element. Note that the Beacon may include not the UORA element but information that announces only information (update of the counter) representing that the UORA has been changed, which similarly applies to the following description. In this case, for example, when the AP 100 receives a Probe request from an STA, it can notify the STA of changed parameters including the changed UORA parameter by a Probe Response transmitted to the STA.

Thereafter, if the AP 100 receives a connection request from an STA (YES in step S905), it executes connection processing (Association processing) with the STA (step S906). This procedure is similar to a conventional one and will not be explained in detail. If the AP 100 receives a G-AID assignment request from the STA (YES in step S907), it updates the G-AID table (step S908) and notifies the STA of the assigned G-AID (step S909). Note that the G-AID assignment request and the assignment may be performed, for example, at the time of connection processing, as in S703 and S706 of FIG. 7A, or may be performed independently after connection is established, as in S801 and S803 of FIG. 8A. If there is an STA to which the change of the G-AID needs to be announced (YES in step S910), in addition to the STA requesting assignment of the G-AID, the AP 100 notifies the STA of the G-AID (step S911). This processing corresponds to, for example, processing of notifying the STA 101 of a newly assigned G-AID by the AP 100 in S804 as a result of adjustment in S802 of FIG. 8A. Note that the AP 100 can hold information representing the priority order of each STA, the type of communication service executed by each STA, and the like, and adjust and assign a G-AID with respect to each STA based on the information. When the AP 100 receives a connection request or a G-AID update request from an STA, it can execute connection processing at an arbitrary timing other than the timing of steps S905 to S911.

If there is data to be transmitted to each STA on a downlink (DL) (YES in step S912), the AP 100 transmits the DL data to a target STA (step S913) and receives an ACK from the STA (step S914). If the AP 100 does not receive an ACK from the STA serving as the DL data transmission destination, it retransmits the DL data. Note that the DL data may be data arriving at the AP 100 via the BSS 105 or the DS 106 or, for example, data arriving from a predetermined server or the like on the network. When DL data to be transmitted to each STA is generated, the AP 100 can execute DL data transmission processing at an arbitrary timing other than the timing of steps S912 to S914.

In response to a TF transmission timing (YES in step S916), the AP 100 executes processing for TF transmission. Note that the TF transmission timing can be a timing arriving in a predetermined period, a timing based on a predetermined schedule, a timing when it is detected that a wireless medium is idle, or the like. In the processing for TF transmission, first, the AP 100 checks the state of retention of the transmission queue of each STA (step S916). For example, the AP 100 can check the detention state of the transmission queue of each STA by receiving a notification by a BSR (Buffer Status Report) from the STA. The BSR may be announced, for example, from the STA by the QoS Control 408 of the MAC Frame or as a response to a TF with the TF Type 611=4 transmitted from the AP 100. Note that the state of retention of the transmission queue may be checked by a method other than the BSR. Based on the G-AID table and the state of retention of the transmission queue, the AP 100 sets an AID 12 value to be associated with each RU in the TF (step S917). For example, for an STA known to have transmission target data in step S916, the AP 100 prepares a RU in which the AID (not for random access) of the STA is designated, and designates a random access AID as for other RUs. In setting of the random access AID, the AP 100 sets a G-AID so that an STA of high priority (requiring a short time till access to a wireless medium) can readily acquire the access right. For example, when there is a G-AID assigned to only an STA of high priority, the AP 100 decides to designate the G-AID for some RUs. The G-AID designation is decided using the G-AID table. The AP 100 transmits the TF in which an AID corresponding to each RU is designated as in step S917 (step S918), and receives a TB PPDU based on the TF from each STA (step S919). If the reception is successful, the AP 100 transmits an ACK to the transmission source STA (step S920). Note that the ACK can be an OFDMA BA or a Multi-STA BA.

If the AP 100 receives a disconnection request from the STA (YES in step S921), it executes disconnection processing from the STA (step S922). For example, if the update (change of the G-AID) of the G-AID table is necessary based on the disconnection (YES in step S923), the AP 100 notifies the STA for which the G-AID needs to be changed, of an updated G-AID (step S924). Note that when the AP 100 receives a disconnection request from the STA, it can execute disconnection processing at an arbitrary timing other than the timing of steps S921 to S924.

After that, if the end of the operation of the AP is requested by, for example, a user operation and the AP 100 is to end the operation of the AP (YES in step S925), it ends the processing. In this case, the AP 100 performs disconnection processing from the connected STA and processing necessary when ending the function of the AP. Note that if the AP 100 continues the operation of the AP (NO in step S925), it returns the processing to step S903 and continues the communication.

(Processing Sequence Executed by STA)

Subsequently, an example of a processing sequence executed by the STA (STAs 101 to 104) will be explained with reference to FIGS. 10A and 10B. This processing can be implemented by, for example, executing a computer program stored in the storage unit 201 of the STA by the control unit 202. However, this is merely an example, and part or all of the following processing may be executed by dedicated hardware. This processing can be executed when, for example, the STA is turned on.

First, the STA is connected to the AP 100, obtains an UORA parameter from the AP 100 by, for example, a Beacon or a Probe Response, and sets the OBO counter (step S1001). Then, the STA decides and updates the states and attributes of communication and an application executed by the STA (step S1002). At this time, the STA specifies and manages a state such as whether it performs real-time communication (or whether it is executing such an application) with a strict request to an access delay such that extended random access according to this embodiment is necessary. In accordance with, for example, whether the STA is in a state with a strict request to an access delay, the STA decides whether to transmit a G-AID request (step S1003). If the STA decides to transmit a G-AID request (YES in step S1003), it transmits a G-AID assignment request to the AP 100 and receives the response (step S1004). If the response includes a G-AID, the STA sets the value as a G-AID assigned to the STA.

Thereafter, the STA waits for receiving a TF from the AP 100 (step S1005). If the STA does not receive a TF from the AP 100 (NO in step S1005), it shifts the processing to step S1014. If the STA receives a TF from the AP 100 (YES in step S1005), it determines whether an individual RU is allocated to the STA (step S1006). If there is no individual RU allocated to the STA (NO in step S1006), the STA determines whether there is a subtraction-target random access RU of the STA (step S1007). For example, the STA determines whether the TF includes a RU of AID 12=0 or, for example, a RU of AID 12 corresponding to a G-AID assigned to the STA in step S1004 (or corresponding to a G-AID of lower priority). If the TF includes such a RU (YES in step S1007), the STA executes OBO counter subtraction processing in accordance with the number of such RUs (step S1008). If the OBO counter has not reached 0 (NO in step S1009), the STA shifts the processing to step S1014. If the OBO counter has reached 0 (YES in step S1009), the STA shifts the processing to step S1010. If there is an individual RU allocated to the STA (YES in step S1006), the STA executes setting for using the individual RU allocated to the STA (step S1010). Also, if the OBO counter has reached 0 (YES in step S1009), the STA executes setting for using a random access RU (step S1010). This setting is performed based on, for example, each piece of information included in the Per User Info 606 of the TF. The STA transmits a TB PPDU to the AP 100 (step S1011), and receives an ACK (for example, OFDMA BA or Multi-STA BA) from the AP 100 (step S1012). After transmitting data, the STA sets again the OBO counter in accordance with an OCW Range (step S1013).

In step S1014, the STA determines whether access to a wireless medium is possible by an EDCA (Enhanced Distributed Channel Access). If the STA determines that access is impossible by the EDCA (NO in step S1014), it shifts the processing to step S1017. If the STA determines that access is possible by the EDCA (YES in step S1014), it transmits a SU (Single User) PPDU to the AP 100 (step S1015), and receives an ACK (or BA) from the AP 100 (step S1016). After that, if the STA receives DL data from the AP 100 (YES in step S1017), it transmits an ACK (or BA) to the AP 100 (step S1018). If the end of the operation of the STA is requested by, for example, a user operation and the STA is to end the operation of the STA (YES in step S1019), it ends the processing. In this case, the STA performs disconnection processing from the connected AP and processing necessary when ending the function of the STA. Note that if the STA continues the operation of the STA (NO in step S1019), it returns the processing to step S1002 and continues the communication.

As described above, according to this embodiment, the first STA with a small allowance for a delay of access to a wireless medium advances reduction of the OBO counter faster than the second STA with a relatively large allowance. The time until the first STA accesses a wireless medium can be shortened. At this time, access to a wireless medium can be adjusted for each STA without using a plurality of OBO counters. Therefore, flexible access control can be provided while preventing an increase in influence on the apparatus arrangement.

According to the present invention, access to a wireless medium by an STA in a wireless LAN can be controlled efficiently.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:

a setting unit configured to perform setting of connection between the communication apparatus and another communication apparatus;

a reception unit configured to receive from the other communication apparatus a predetermined radio frame including information designating frequency resources for transmitting data from the other communication apparatus to at least one apparatus; and a communication unit configured to, in a case where a first identifier for random access is assigned to the communication apparatus in the setting of the connection, perform communication by acquiring a transmission right of data to the other communication apparatus by random access based on a sum of a first number of frequency resources associated with the first identifier and a second number of frequency resources associated with a second identifier for random access different from the first identifier in the predetermined radio frame.

2. The communication apparatus according to claim 1, wherein in a case where the sum reaches a predetermined value, the communication unit acquires the transmission right.

3. The communication apparatus according to claim 2, wherein in a case where an identifier for random access is not assigned to the communication apparatus in the setting of the connection, the communication unit acquires the transmission right based on reach of the second number to the predetermined value regardless of the first number.

4. The communication apparatus according to claim 2, wherein the communication unit includes one counter configured to perform subtraction processing using the predetermined value as an initial value.

5. The communication apparatus according to claim 1, wherein in a case where a third identifier for random access different from the first identifier and the second identifier is further assigned to the communication apparatus in addition to the first identifier in the setting of the connection, in a case where a value obtained by adding to the sum a third number of frequency resources associated with the third identifier in the predetermined radio frame reaches a predetermined value, the communication unit acquires the transmission right.

6. The communication apparatus according to claim 5, wherein in a case where the first identifier is assigned to the communication apparatus but the third identifier is not assigned, in a case where the sum of the first number and the second number reaches the predetermined value regardless of the third number, the communication unit acquires the transmission right.

7. The communication apparatus according to claim 1, wherein in a case where the first identifier is assigned to the communication apparatus in the setting of the connection, and a third identifier lower in priority than the first identifier exists, in a case where a value obtained by adding to the sum a third number of frequency resources associated with the third identifier in the predetermined radio frame reaches a predetermined value, the communication unit acquires the transmission right.

8. The communication apparatus according to claim 7, wherein in a case where the first identifier is assigned to the communication apparatus in the setting of the connection, and a fourth identifier higher in priority than the first identifier exists, the communication unit acquires the transmission right based on the sum regardless of a fourth number of frequency resources associated with the fourth identifier.

9. The communication apparatus according to claim 1, wherein the setting unit receives assignment of the first identifier from the other communication apparatus by sending a request to the other communication apparatus in establishing connection or during connection.

10. The communication apparatus according to claim 1, wherein the communication apparatus is a station complying with the IEEE 802.11 standard.

11. The communication apparatus according to claim 10, wherein the predetermined radio frame is a trigger frame, and the frequency resource is a resource unit.

12. A communication apparatus comprising:

a setting unit configured to perform setting including assignment of a first identifier for random access to another first communication apparatus that is to acquire a transmission right of data preferentially by random access;

a generation unit configured to generate a predetermined radio frame including information designating frequency resources for transmitting data to another apparatus, the predetermined radio frame designating frequency resources for random access associated with the first identifier, the number of which is counted to acquire the transmission right of data by the other first communication apparatus, and frequency resources for random access associated with a second identifier different from the first identifier, the number of which is counted to acquire the transmission right of data by the other first communication apparatus and another second communication apparatus not assigned with the first identifier; and a transmission unit configured to transmit the predetermined radio frame, wherein the other first communication apparatus and the other second communication apparatus acquire the transmission right of data by frequency resources for random access based on the counted number.

13. The communication apparatus according to claim 12, wherein the setting unit further assigns a third identifier for random access to the other first communication apparatus, and the generation unit generates the predetermined radio frame further designating frequency resources for random access associated with the third identifier, the number of which is counted to acquire the transmission right of data by the other first communication apparatus.

14. The communication apparatus according to claim 13, wherein the number of frequency resources for random access associated with the third identifier is not counted by another third communication apparatus assigned with the first identifier and not assigned with the third identifier.

15. The communication apparatus according to claim 12, wherein the first identifier is set to be higher in priority than a third identifier for random access, and the generation unit generates the predetermined radio frame further designating frequency resources for random access associated with the third identifier, the number of which is counted to acquire the transmission right of data by the other first communication apparatus assigned with the first identifier.

16. The communication apparatus according to claim 15, wherein the first identifier is set to be lower in priority than a fourth identifier for random access, and the generation unit generates the predetermined radio frame further designating frequency resources for random access associated with the fourth identifier, the number of which is counted to acquire the transmission right of data by another third communication apparatus assigned with the fourth identifier, but the number of which is not counted to acquire the transmission right of data by the other first communication apparatus.

17. The communication apparatus according to claim 12, wherein the communication apparatus is a station complying with the IEEE 802.11 standard.

18. The communication apparatus according to claim 17, wherein the predetermined radio frame is a trigger frame, and the frequency resource is a resource unit.

19. A control method executed by a communication apparatus, the method comprising:

performing setting of connection between the communication apparatus and another communication apparatus;

receiving from the other communication apparatus a predetermined radio frame including information designating frequency resources for transmitting data from the other communication apparatus to at least one apparatus; and in a case where a first identifier for random access is assigned to the communication apparatus in the setting of the connection, performing communication by acquiring a transmission right of data to the other communication apparatus by random access based on a sum of a first number of frequency resources associated with the first identifier and a second number of frequency resources associated with a second identifier for random access different from the first identifier in the predetermined radio frame.

20. A control method executed by a communication apparatus, the method comprising:

performing setting including assignment of a first identifier for random access to another first communication apparatus that is to acquire a transmission right of data preferentially by random access;

generating a predetermined radio frame including information designating frequency resources for transmitting data to another apparatus, the predetermined radio frame designating frequency resources for random access associated with the first identifier, the number of which is counted to acquire the transmission right of data by the other first communication apparatus, and frequency resources for random access associated with a second identifier different from the first identifier, the number of which is counted to acquire the transmission right of data by the other first communication apparatus and another second communication apparatus not assigned with the first identifier; and transmitting the predetermined radio frame, wherein the other first communication apparatus and the other second communication apparatus acquire the transmission right of data by frequency resources for random access based on the counted number.

* * * * *